(12) United States Patent
Wang et al.

(10) Patent No.: US 9,165,156 B2
(45) Date of Patent: Oct. 20, 2015

(54) ROLE-BASED ACCESS CONTROL MODELING AND AUDITING SYSTEM

(71) Applicant: Microsoft Corporation, Redmond, WA (US)

(72) Inventors: Jingcun Wang, Sammamish, WA (US); Lin Tang, Suzhou (CN); Yingchun Xuan, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 198 days.

(21) Appl. No.: 13/692,711

(22) Filed: Dec. 3, 2012

(65) Prior Publication Data

US 2014/0157350 A1 Jun. 5, 2014

(51) Int. Cl.
*H04L 29/06* (2006.01)
*G06F 21/62* (2013.01)
*G06F 21/60* (2013.01)

(52) U.S. Cl.
CPC .......... *G06F 21/6218* (2013.01); *G06F 21/604* (2013.01); *G06F 2221/2149* (2013.01)

(58) Field of Classification Search
CPC . G06F 21/62; G06F 21/6209; G06F 21/6218; G06F 2221/2141
USPC .......... 726/1, 27; 713/165–167, 193; 380/211
See application file for complete search history.

(56) References Cited

U.S. PATENT DOCUMENTS

| 7,650,633 | B2 | 1/2010 | Whitson |
| 7,827,615 | B1 | 11/2010 | Allababidi et al. |
| 7,933,925 | B2 | 4/2011 | Sreedhar |
| 7,962,426 | B2 | 6/2011 | Pall et al. |
| 2007/0136603 | A1* | 6/2007 | Kuecuekyan ................. 713/185 |
| 2007/0261124 | A1* | 11/2007 | Centonze et al. ............... 726/27 |
| 2009/0019516 | A1 | 1/2009 | Hammoutene et al. |

OTHER PUBLICATIONS

Sandhu, et al., "Role-Based Access Control Models", Retrieved at <<http://csrc.nist.gov/rbac/sandhu96.pdf>>, IEEE Computer, Feb. 1996, pp. 22.
Bruzzese, J. Peter, "Permissions and Role Based Access Control (RBAC)—Part II", Retrieved at <<http://www.petri.co.il/role-based-access-control-exchange-2010.htm>>, IEEE, Retrieved Date: May 31, 2012, pp. 13.

* cited by examiner

*Primary Examiner* — Justin T Darrow
(74) *Attorney, Agent, or Firm* — Aneesh Mehta; Timothy Churna; Micky Minhas

(57) ABSTRACT

A role-based access control (RBAC) modeling and auditing system is described that enables a user to access and/or create security roles that can be applied to users of a first software application. When a security role having a particular set of permissions has been accessed or created, the system can present a simulated user interface (UI) that indicates information that can be viewed and/or actions that can be performed by a user to whom the security role has been assigned when interacting with the first software application. The system may further provide "run as" functionality that enables a simulated UI to be generated for a particular user and that can display the security role(s) associated with the particular user. The system may be embodied in a second software application, such as a tool that is associated with the first software application.

20 Claims, 14 Drawing Sheets

ROLE-BASED ACCESS CONTROL MODELING AND AUDITING SYSTEM

BACKGROUND

In computer systems security, role-based access control (RBAC) is an approach to restricting system access to authorized users. RBAC is currently used by many enterprises. In accordance with an RBAC scheme, security roles are created for various job functions within an organization. Permissions to view certain information and perform certain actions are associated with specific security roles. Employees or other system users are assigned particular security roles, and through such assignments acquire the permissions associated with those roles. Since users are not assigned permissions directly, but only acquire them through their security role (or roles), management of individual user rights becomes a matter of simply assigning appropriate security roles to the user's account. This simplifies common operations, such as adding a user, changing a user's department, or the like.

Software applications exist that allow a user to view information and perform actions by interacting with a user interface (UI), where the information that can be viewed and the actions that can be performed depend upon the security role(s) currently assigned to the user in accordance with an RBAC scheme. By way of example, SYSTEM CENTER 2012 CONFIGURATION MANAGER, published by Microsoft Corporation of Redmond Wash., is a systems management software product that enables an administrator to access and create various security roles having different sets of permissions and to assign one or more of these security roles to a user. When such user logs into SYSTEM CENTER 2012 CONFIGURATION MANAGER, he is presented with an administrative console UI that enables him to view only that information and perform only those actions that are authorized for his assigned security role(s). However, this is only one example, and other software applications exist that determine the information that can be viewed and/or the actions that can be performed by a user via a UI based on one or more security roles assigned thereto.

When an administrator interacts with a software application such as was described in the preceding paragraph to access or create a security role, such administrator may have a difficult time determining what information and actions will be made accessible via the application UI for the security role. This may be the case, for example, where there is a complex relationship between the permissions that can be assigned to the security roles and the information/actions that become accessible via the UI as a result of assigning such permissions. This may also be the case, for example, where the number of different operations that may be associated with each security role is very large.

Conventionally, one way that an administrator can determine what information can be viewed and what actions can be performed by a particular security role or combination of security roles via the UI is to create an actual user account, assign the particular security role(s) to the user associated with the user account, and then log on to the application as the user to see what information can be viewed and what actions can be performed via the application UI. However, this approach is extremely inefficient, cumbersome, and time consuming.

In certain software applications that support RBAC, it may not be easy for an administrator to determine which security roles have been assigned to a particular user. For example, such a software application may enable one or more security roles to be assigned to a user group that includes the particular user, but may display only the association between the security role(s) and the user group. Furthermore, an administrator may have a difficult time determining what information and actions will be made accessible to a particular user via the application UI based on the user's assigned security role(s). One way to obtain such information would be for the administrator to log on to the application as the user. However, such log on procedure typically requires entry of a password that is known only to the user and is therefore not accessible to the administrator. Furthermore, such an approach is extremely inefficient, cumbersome and time consuming.

SUMMARY

Systems, methods and computer program products are described herein that enable a user to access or create security roles that can be applied to users of a first software application in accordance with a role based access control (RBAC) scheme. When a security role having a particular set of permissions is accessed or created, a simulated user interface (UI) may be presented that indicates one or more of information that can be viewed by a user to whom the security role has been assigned when interacting with the first software application and one or more actions that can be performed by the user to whom the security role has been assigned when interacting with the first software application. The security role accessing/creating and UI simulation features may be performed by a second software application, such as a tool, that is different from the first software application.

Systems, methods are also described herein that enable a first user to identify a second user of the first software application. Based on one or more security roles that have been associated with the second user in accordance with an RBAC scheme, a simulated UI may be presented that indicates one or more of information that can be viewed by the second user when interacting with the first software application and one or more actions that can be performed by the second user when interacting with the first software application. The security role(s) associated with the user may also be presented. The identification of the second user, UI simulation, and presentation of the security role(s) may be performed by a second software application, such as a tool, that is different from the first software application.

Some particular embodiments will now be described by way of example and without limitation. For example, a computer-implemented method is described herein. In accordance with the method, one or more first user interface elements are presented that allow a user to access or create a first security role, the first security role having one or more permissions associated therewith. Subsequent to the user accessing or creating the first security role via the one or more first user interface elements, one or more second user interface elements are presented. The one or more second user interface elements indicate at least one of: information that can be viewed by a user to whom the first security role has been assigned when the user to whom the first security role has been assigned interacts with a first software application, and one or more actions that can be performed by the user to whom the first security role has been assigned when the user to whom the first security role has been assigned interacts with the first software application. In certain embodiments, the one or more second user interface elements are presented concurrently with the one or more first user interface elements.

In accordance with the foregoing method, presenting the one or more first user interface elements may include presenting one or more user interface elements that allow the user to select the first security role from among a plurality of predefined security roles and/or that allows the user to select the one or more permissions associated with the first security role.

In one embodiment of the method, presenting the one or more first user interface elements includes presenting one or more user interface elements that further allow the user to access or create a second security role having at least one permission associated therewith that is not associated with the first security role. In accordance with such an embodiment, the method may further include modifying the one or more second user interface elements such that the one or more second user interface elements indicate at least one of: information that can be viewed by a user to whom the second security role has been assigned when the user to whom the second security role has been assigned interacts with the first software application, and one or more actions that can be performed by the user to whom the second security role has been assigned when the user to whom the second security role has been assigned interacts with the first software application.

In another embodiment, the method further includes determining that the user has one or more required permissions, and performing the presenting steps only if a determination is made that the user has the one or more required permissions.

In a further embodiment, the method steps are performed by a second software application that is different than the first software application. The second software application may comprise, for example, a tool within a toolkit associated with the first software application. In accordance with such an embodiment, the second software application may obtain configuration data stored in a database associated with the first software application. The configuration data may include at least one or more permissions that may be associated with a security role, and for each of the one or more permissions, one or more of information viewable by a user having the permission and one or more actions performable by a user having the permission. Such configuration data may be cached by the second software application. The second software application may then use the configuration data to generate at least one of the one or more first user interface elements and the one or more second user interface elements.

A system is also described herein. The system includes one or more processors and a storage medium that stores computer program logic that is executable by the one or more processors. The computer program logic includes first computer program logic and second computer program logic. The first computer program logic is programmed to cause the one or more processors to present one or more first user interface elements that allow a user to access or create a first security role, the first security role having one or more permissions associated therewith. The second computer program logic is programmed to cause the one or more processors to present one or more second user interface elements concurrently with the one or more first user interface elements. The one or more second user interface elements indicate: information that can be viewed by a user to whom the first security role has been assigned when the user to whom the first security role has been assigned interacts with a first software application, and one or more actions that can be performed by the user to whom the first security role has been assigned when the user to whom the first security role has been assigned interacts with the first software application.

The one or more first user interface elements of the foregoing system may allow the user to select the first security role from among a plurality of predefined security roles and/or select the one or more permissions associated with the first security role.

In one embodiment, the one or more first user interface elements further allow the user to access or create a second security role having at least one permission associated therewith that is not associated with the first security role. In further accordance with this embodiment, the second computer program logic may be programmed to cause the one or more processors to modify the one or more second user interface elements such that the one or more second user interface elements indicate: information that can be viewed by a user to whom the second security role has been assigned when the user to whom the second security role has been assigned interacts with the first software application, and one or more actions that can be performed by the user to whom the second security role has been assigned when the user to whom the second security role has been assigned interacts with the first software application.

In another embodiment, the computer program logic stored by the storage medium further includes third computer program logic. The third computer program logic is programmed to cause the one or more processors to determine whether the user has one or more required permissions. In further accordance with this embodiment, the first computer program logic may be programmed to cause the one or more processors to present the one or more first user interface elements and the second computer program logic may be programmed to cause the one or more processors to present the one or more second user interface elements only if a determination is made that the user has the one or more required permissions.

In a further embodiment, the first computer program logic and the second computer program logic comprise portions of a second software application that is different than the first software application, such as a tool within a toolkit associated with the first software application. In further accordance with such an embodiment, the computer program logic stored by the storage medium may further include third computer program logic. The third computer program logic may be programmed to cause the one or more processors to obtain configuration data stored in a database associated with the first software application. The configuration data may include at least one or more permissions that may be associated with a security role, and for each of the one or more permissions, one or more of information viewable by a user having the permission and one or more actions performable by a user having the permission. The first computer program logic may be programmed to cause the one or more processors to generate the one or more first user interface elements using the configuration data and the second computer program logic may be programmed to cause the one or more processors to generate the one or more second user interface elements using the configuration data. The third computer program logic may be further programmed to cause the one or more processors to cache the obtained configuration data.

Another computer-implemented method is described herein. In accordance with the method, one or more first user interface elements are presented that allow a first user to input an identifier of a second user of a first software application. Subsequent to the user inputting the identifier of the second user via the one or more first user interface elements, one or more security roles assigned to the second user are identified based on the identifier of the second user. One or more second user elements are then generated based at least on the identified one or more security roles. The one or more second user interface elements indicate of at least one of: information that can be viewed by the second user when the second user interacts with the first software application, and one or more actions that can be performed by the second user when the second user interacts with the first software application. The one or more second user interface elements are then presented. The foregoing method may further include presenting one or more third user interface elements that show the identified one or more security roles. The foregoing method may be performed by a second software application that is different than the first software application, such as a tool within a toolkit associated with the first application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
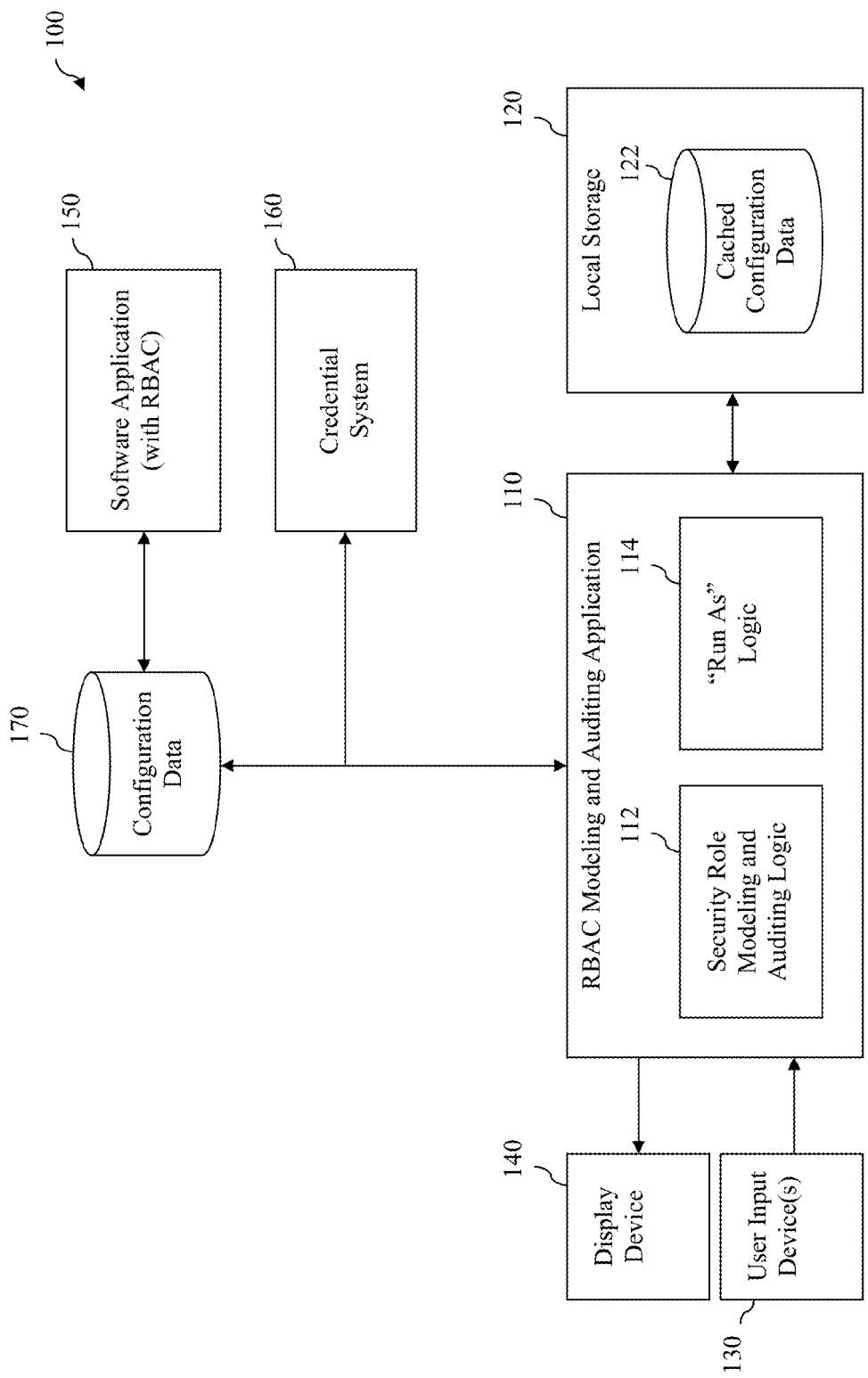
FIG. 1 is a block diagram of a role-based access control (RBAC) modeling and auditing system in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

A role-based access control (RBAC) modeling and auditing system will now be described. In particular, Section II describes an RBAC modeling and auditing system that enables a user to access and/or create security roles that can be applied to users of a first software application. When a security role having a particular set of permissions has been accessed or created, the RBAC modeling and auditing system can present a simulated user interface (UI) that indicates one or more of: information that can be viewed by a user to whom the security role has been assigned when interacting with the first software application and one or more actions that can be performed by the user to whom the security role has been assigned when interacting with the first software application. The RBAC modeling and auditing functionality may be embodied in a second software application, such as a tool, that is different from the first software application.

Section III describes "Run As" functionality of the RBAC modeling and auditing system. Such functionality enables a first user to identify a second user of the first software application. Then, based on one or more security roles that have been associated with the second user, the RBAC modeling and auditing system can present a simulated UI that indicates one or more of information that can be viewed by the second user when interacting with the first software application and one or more actions that can be performed by the second user when interacting with the first software application. Such "Run As" functionality may also be used to cause the RBAC modeling and auditing system to present the security role(s) associated with the second user.

Section IV describes an example processor-based computer system that may be used to implement certain features described herein, and Section V provides some concluding remarks.

II. Role-Based Access Control Modeling and Auditing System

FIG. 1 is a block diagram of a role-based access control (RBAC) modeling and auditing system 100 in accordance with an embodiment. As shown in FIG. 1, RBAC modeling and auditing system 100 includes an RBAC modeling and auditing application 110. RBAC modeling and auditing application 110 is intended to represent a computer program or process that is executed by a processor-based computer system or device to perform certain functions that will be described herein. One example of a processor-based computer system that may be used to execute RBAC modeling and auditing application 110 will be described herein in reference to FIG. 16. However, that example and is not intended to be limiting. Depending upon the implementation, RBAC modeling and auditing application 110 may be executed by any of a desktop computer, a laptop computer, a tablet computer, a netbook computer, a handheld computing device, or the like.

RBAC modeling and auditing application 110 is programmed to perform certain functions in response to user input received from one or more user input devices 130. Such user input device(s) may be connected to or comprise an integrated part of a machine upon which RBAC modeling and auditing application 110 is running. User input device(s) 130 may include one or more of a keyboard, a mouse, a touch screen (e.g., a touch screen integrated with a display), a touch pad, a trackball, a joystick, a pointing stick, a wired glove, a motion tracking sensor, a video capture device such as a camera, or the like. However, these examples are not intended to be limiting and other user input device(s) not specifically mentioned herein may be used to provide user input to RBAC modeling and auditing application 110. In one embodiment, user input events generated when a user interacts with user input device(s) 130 are received by RBAC modeling and auditing application 110 via an operating system (OS) that is executing on the same machine as RBAC modeling and auditing application 110.

RBAC modeling and auditing application 110 is also programmed to generate output in the form of graphical information for rendering to a display device 140. As will be discussed herein, such graphical information may represent one or more user interface elements associated with RBAC modeling and auditing application 110.

Display device 140 is intended to broadly represent any device that is capable of rendering graphical or video images for viewing by a user. In certain implementations, display device 140 may comprise a monitor, a projector, or other type of display device that is physically separate from a machine upon which RBAC modeling and auditing application 110 is running and connected thereto via a suitable wired and/or wireless connection. Alternatively, display device 140 may comprise a device that is integrated within a same physical structure or housing as a machine upon which RBAC modeling and auditing application 110 is running, such as an integrated display in a laptop computer, tablet computer, netbook computer, or the like. In certain embodiments, graphical information output by RBAC modeling and auditing application 110 is provided to a graphics subsystem of a machine upon which RBAC modeling and auditing application 110 is running and the graphics subsystem causes such graphical information to be rendered to display device 140.

RBAC modeling and auditing application 110 is further programmed to obtain data from local storage 120 and to store data thereto. Local storage 120 is intended to represent any volatile or non-volatile, removable or non-removable computer storage medium or media implemented in any method or technology for storage of information such as computer-readable instructions, data structures, software modules or other data. Local storage 120 may include, but is not limited to, one or more of RAM, ROM, EEPROM, flash memory or other memory technology, a hard disk, a CD-ROM, digital versatile disks (DVD) or other optical disk storage, magnetic cassettes, magnetic tape, magnetic disk storage or other magnetic storage devices, or any other medium which can be used to store desired information and which can be accessed by RBAC modeling and auditing application 110.

As will be discussed herein, RBAC modeling and auditing application 110 is also programmed to access configuration data 170 associated with a software application 150 that provides RBAC. Software application 150 is intended to represent a software application that allows users thereof to view information and perform actions by interacting with a corresponding UI thereof, where the information that can be viewed and the actions that can be performed by each user depend upon one or more security role(s) that are currently assigned to that user in accordance with an RBAC scheme.

In one embodiment, software application 150 comprises SYSTEM CENTER 2012 CONFIGURATION MANAGER, published by Microsoft Corporation of Redmond Wash. SYSTEM CENTER 2012 CONFIGURATION MANAGER is a systems management software product that enables users thereof to manage large groups of computer systems and that provides features such as remote control, patch management, software distribution, operating system deployment, network access protection, and hardware and software inventory. SYSTEM CENTER 2012 CONFIGURATION MANAGER also supports an RBAC scheme. In particular, SYSTEM CENTER 2012 CONFIGURATION MANAGER permits an administrator to access and create various security roles having different sets of permissions and to assign one or more of these security roles to a user. When such user logs into SYSTEM CENTER 2012 CONFIGURATION MANAGER, he is presented with a UI (in particular, an administration console UI) that enables him to view only that information and perform only those actions that are authorized for his assigned security role(s).

However, this is only one example, and software application 150 may comprise any other software application that determines the information that can be viewed and/or the actions that can be performed by a user via a UI based on one or more security roles assigned thereto.

Configuration data 170 comprises data associated with software application 150. Configuration data 170 may be stored in a non-volatile storage system or device that is accessible to software application 150. Configuration data 170 may be stored within a database, a file, or some other collection of data. In an embodiment, configuration data 170 includes one or more of: (1) one or more security roles that may be assigned to users of software application 150 and one or more permissions associated with each security role, (2) one or more permissions that may be associated with a security role and for each of the one or more permissions, one or more of information viewable by a user having the permission and one or more actions performable by a user having the permission, and (3) one or more users of software application 150 and for each user, one or more security roles that have been assigned to the user. Configuration data 170 may include other information associated with software application 150 as well.

RBAC modeling and auditing application 110 is further configured to access a credential system 160. Credential system 160 is a system that operates to store and retrieve credentials, such as a username and password, associated with users of a computer system or application. In one embodiment, credential system 160 stores credentials for users of software application 150. In one embodiment, credential system 160 is implemented using ACTIVE DIRECTORY®, a directory service published by Microsoft Corporation. However, this example is not intended to be limiting and any of a wide variety of credential systems may be used.

In one embodiment, software application 150 and credential system 160 are executed by machines that are remotely located from a machine on which RBAC modeling and auditing application 110 is executed. In accordance with such an embodiment, such machines may be connected to each other via one or more wired and/or wireless networks (including local area and wide area networks) and communications between the machines may be carried out using well-known network communication protocols. In further accordance with such an embodiment, configuration data 170 may be stored remotely with respect to a machine on which RBAC modeling and auditing application 110 is executed and may be accessed by RBAC modeling and auditing application 110 via one or more wired and/or wireless network(s).

In an alternate embodiment, RBAC modeling and auditing application 110 is executed on the same machine as one or more of software application 150 and credential system 160. Still other configurations are possible.

In one embodiment, RBAC modeling and auditing application 110 comprises a tool within a toolkit associated with software application 150 that can be executed independently of software application 150 to perform RBAC modeling and auditing functions therefor. The tool may be lightweight in the sense that it does not require significant computing resources for execution, and its execution may require less computing resources as compared to those required to interact with software application 150.

For example, in an embodiment in which software application 150 comprises SYSTEM CENTER 2012 CONFIGURATION MANAGER, RBAC modeling and auditing application 110 may comprise a tool within SYSTEM CENTER 2012 CONFIGURATION MANAGER TOOLKIT, published by Microsoft Corporation of Redmond, Wash. Such tool comprises a lightweight component that may be executed independently of SYSTEM CENTER 2012 CONFIGURATION MANAGER to perform RBAC modeling and auditing functions.

In an alternate implementation (not shown in FIG. 1), the functionality of RBAC modeling and auditing application 110 may actually be included within software application 150.

As further shown in FIG. 1, RBAC modeling and auditing application 110 includes computer program logic. In particular, RBAC modeling and auditing application 110 includes security role modeling and auditing logic 112 and "run as" logic 114. The functions of security role modeling and auditing logic 112 will now be described, and the functions of "run as" logic 114 will be described in the next section.

Generally speaking, security role modeling and auditing logic 112 enables a user to access and/or create security roles that can be applied to users of software application 150. When a security role having a particular set of permissions has been accessed or created, security role modeling and auditing logic 112 can present a simulated UI that indicates one or more of: information that can be viewed by a user to whom the security role has been assigned when interacting with software application 150 and one or more actions that can be performed by the user to whom the security role has been assigned when interacting with software application 150.

The manner of operation of security role modeling and auditing logic 112 will now be described with further reference to flowchart 200 of FIG. 2. The steps of flowchart 200 may comprise operations performed by security role modeling and auditing logic 112 when such logic executed by one or more processors. Although the method of flowchart 200 is described herein in reference to certain components of RBAC modeling and auditing system 100, it is noted that the method is not so limited, and the method may be performed by other components or systems.

Figure 2:
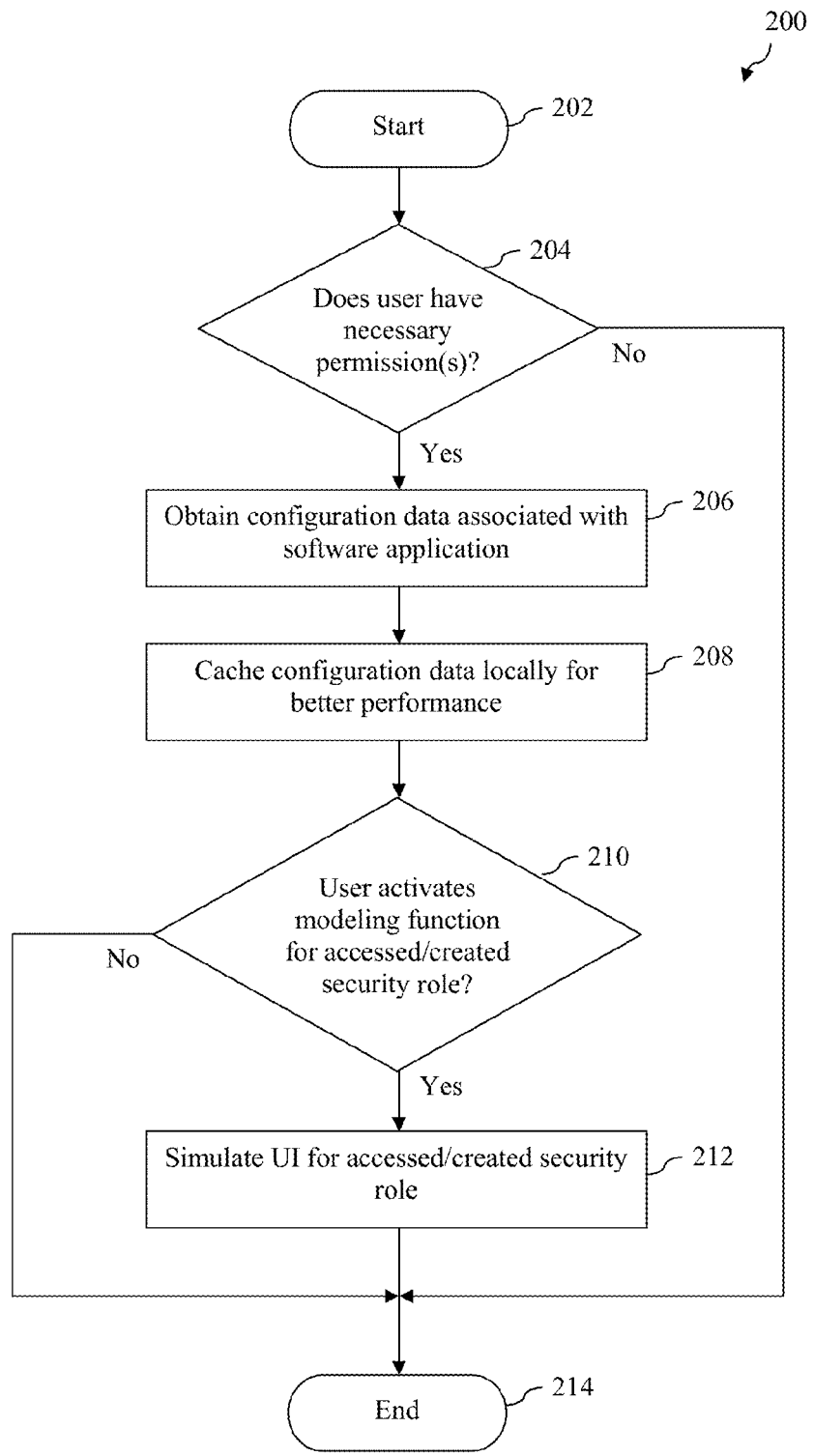
FIG. 2 depicts a flowchart of a method for performing security role modeling and auditing in accordance with an embodiment.

As shown in FIG. 2, the method of flowchart 200 begins at step 202. After step 202, control passes to decision step 204. During decision step 204, security role modeling and auditing logic 112 determines whether or not a user of RBAC modeling and auditing application 110 has one or more permissions necessary to utilize the functions thereof. This step may include, for example, determining whether the user of RBAC modeling and auditing application 110 has been assigned one or more security roles (e.g., full administrator, read-only analyst, or security administrator), has been assigned one or more security scopes (wherein a security scope indicates access to specific secured objects), and/or has been assigned one or more collections (wherein a collection is a group of devices or users the user can manage). However, these are only examples, and a variety of methods may be used to determine if the user of RBAC modeling and auditing application 110 has the necessary permission(s).

If security role modeling and auditing logic 112 determines during decision step 204 that the user of RBAC modeling and auditing application 110 does not have the permission(s) necessary to utilize the functions thereof, then the method ends at step 214.

However, if security role modeling and auditing logic 112 determines during decision step 204 that the user of RBAC modeling and auditing application 110 does have the permission(s) necessary to utilize the functions thereof, then control passes to step 206.

During step 206, security role modeling and auditing logic 112 obtains configuration data 170 associated with software application 150. In this particular embodiment, configuration data 170 is stored in a storage system that is remote with respect to the machine upon which RBAC modeling and auditing application 110 is running and is accessible thereto via one or more networks. Thus, step 206 comprises obtaining configuration data 170 via the one or more networks. After step 206, control passes to step 208.

During step 208, security role modeling and auditing logic 112 caches the configuration data 170 obtained during step 206 in local storage 120, where it is represented as cached configuration data 122. By caching such configuration data locally, performance of certain features of RBAC modeling and auditing application 110 may be improved. After step 208, control passes to decision step 210.

During decision step 210, security role modeling and auditing logic 112 determines whether the user of RBAC modeling and auditing application 110 has activated a modeling function for a security role that he or she has accessed or created using the application. Various exemplary methods for accessing/creating a security role and activating the modeling function using RBAC modeling and auditing application 110 will be provided herein.

If security role modeling and auditing logic 112 determines during decision step 210 that the user of RBAC modeling and auditing application 110 has not activated a modeling function for a security role that he or she has accessed or created using the application, then the method ends at step 214.

However, if security role modeling and auditing logic 112 determines during decision step 210 that the user of RBAC modeling and auditing application 110 has activated a modeling function for a security role that he or she has accessed or created using the application, then control passes to step 212.

During step 212, security role modeling and auditing logic 112 generates and presents a simulated UI of software application 150 to the user of RBAC modeling and auditing application 110. Security role modeling and auditing logic 112 generates the simulated UI by analyzing the accessed/created security role and cached configuration data 122. The simulated UI may represent the UI that would be presented to a user to whom the accessed/created security role has been assigned when such user interacts with (e.g., logs into) software application 150. In particular, the simulated UI may indicate one or more of information that could be viewed by a user to whom the accessed/created security role has been assigned when interacting with software application 150 and one or more actions that can be performed by the user to whom the accessed/created security role has been assigned when interacting with software application 150. After step 212, the method ends at step 214.

Figure 3:
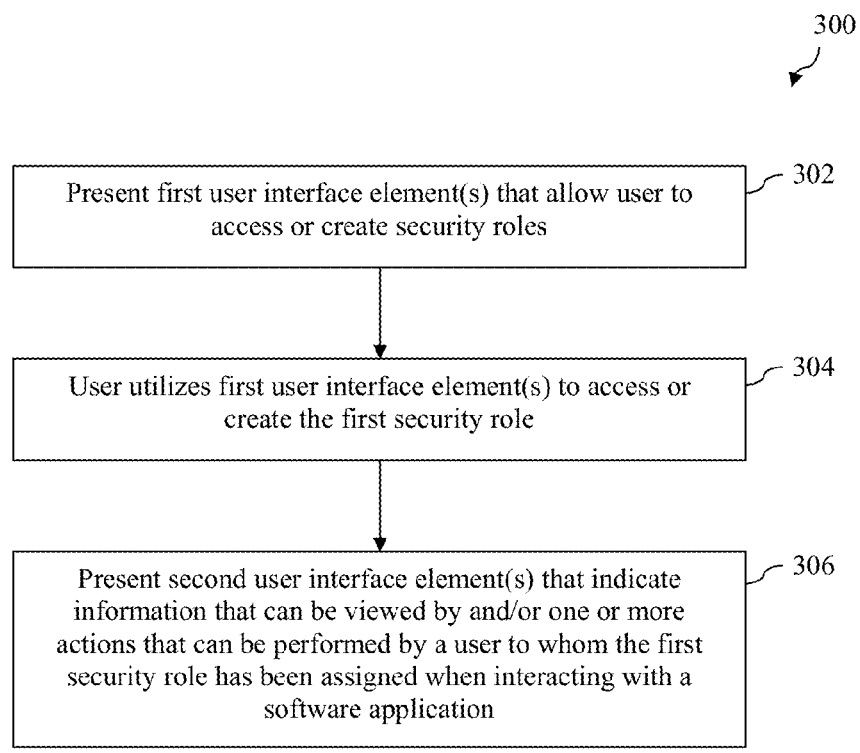
FIG. 3 depicts a flowchart of a method of presenting a simulated UI for a software application in accordance with an embodiment, wherein the simulated UI indicates information viewable and/or actions performable by a particular security role.

The manner of operation of security role modeling and auditing logic 112 will now be further illustrated with respect to FIG. 3. In particular, FIG. 3 depicts a flowchart 300 of a method of presenting a simulated UI for a software application, wherein the simulated UI indicates information viewable and/or actions performable by a particular security role. The steps of flowchart 300 may comprise operations performed by security role modeling and auditing logic 112 when such logic is executed by one or more processors. Although the method of flowchart 300 is described herein in reference to certain components of RBAC modeling and auditing system 100, it is noted that the method is not so limited, and the method may be performed by other components or systems.

As shown in FIG. 3, the method of flowchart 300 begins at step 302, in which security role modeling and auditing logic 112 presents one or more first user interface elements that allow a user of RBAC modeling and auditing application 110 to access or create security roles. The functions of step 302 may be performed, for example, by first computer program logic within security role modeling and auditing logic 112.

At step 304, the user of RBAC modeling and auditing application 110 utilizes the first user interface element(s) to access or create the first security role.

At step 306, security role modeling and auditing logic 112 presents one or more second user interface elements that indicate information that can be viewed by a user to whom the first security role has been assigned when interacting with software application 150 and/or one or more actions that can be performed by the user to whom the first security role has been assigned when interacting with software application 150. These second user interface element(s) comprise a simulated UI of software application 150. The functions of step 306 may be performed, for example, by second computer program logic within security role modeling and auditing logic 112.

In an embodiment, the method of flowchart 300 further includes obtaining configuration data 170 stored in a database associated with software application 150. The function of obtaining configuration data 170 may be performed, for example, by third computer program logic within security role modeling and auditing logic 112. In certain implementations, the third computer program logic may be programmed to cache configuration data 170 in local storage 120, where it is represented as cached configuration data 122. Such configuration data may be used to generate at least one of the one or more first user interface elements and the one or more second user interface elements.

Figure 4:
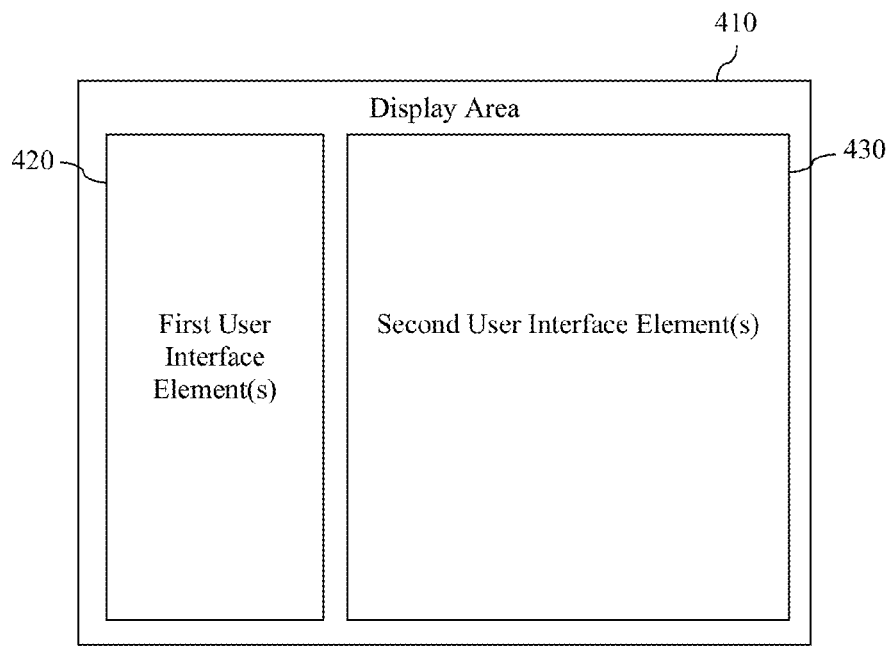
FIG. 4 depicts an example display area in which one or more first user interface elements used to access or create a security role and one or more second user interface elements used to represent a simulated UI for the security role are concurrently displayed in accordance with an embodiment.

In one embodiment, security role modeling and auditing logic 112 is configured to present the first user interface element(s) discussed above in reference to steps 302 and 304 and the second user interface element(s) discussed above in reference to step 306 in a concurrent manner. This is illustrated in FIG. 4, which shows an example display area 410 of display device 140. Display area 410 may comprise, for example and without limitation, an entirety of a screen of display device 140 or a windowed area within a screen of display device 140. As shown in FIG. 4, first user interface element(s) 420, which may represent the first user interface element(s) discussed above in reference to steps 302 and 304, and second user interface element(s) 430, which may represent the second user interface element(s) discussed above in reference to step 306, are concurrently displayed within display area 410. Such an implementation advantageously allows a user of RBAC modeling and auditing application 110 to immediately perceive how changes to a security role created or accessed using first user interface element(s) will impact a simulated UI of software application 150 represented by second user interface element(s) 430.

Certain examples of the first user interface element(s) that a user can interact with to access or create a first security role as referred to in steps 302 and 304 of flowchart 300 will now be provided. By way of example, FIG. 5 shows a portion 500 of a user interface of RBAC modeling and auditing application 110 that includes a plurality of first user interface elements that a user can interact with to access or create a security role.

Figure 5:
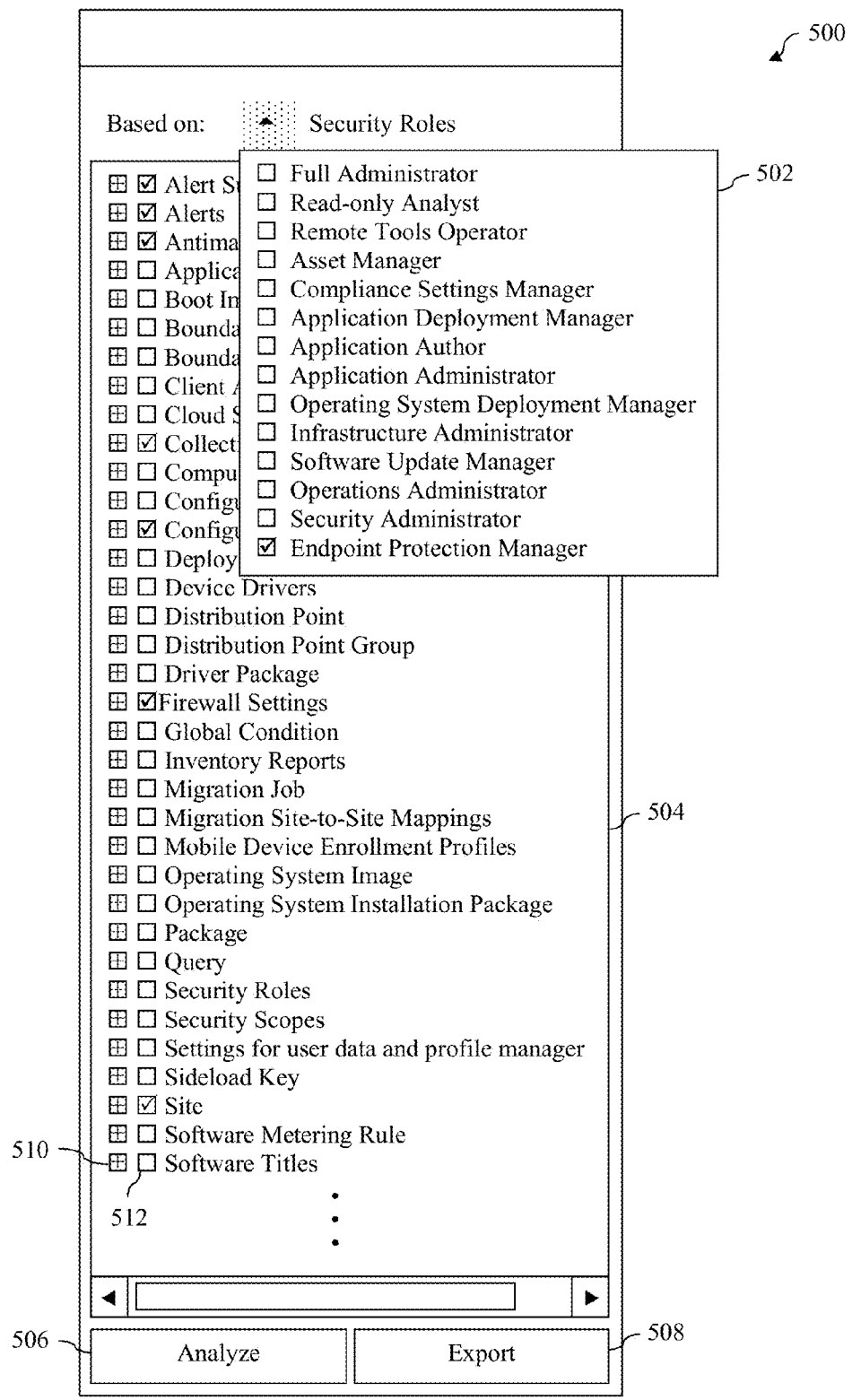
FIG. 5 depicts a portion of a user interface of an RBAC modeling and auditing application in accordance with an embodiment that includes a plurality of first user interface elements that enable a user thereof to access or create a first security role.

In particular, as shown in FIG. 5, user interface portion 500 includes a drop-down menu 502 that includes a plurality of built-in or predefined security roles and a checkbox associated with each. By interacting with the checkbox associated with a particular built-in security role (e.g., by clicking on the checkbox using a pointing device such as a mouse or in some other manner), a user of RBAC modeling and auditing application 110 can access the particular built-in security role. In the example shown in FIG. 5, the user of RBAC modeling and auditing application 110 has selected the built-in security role "Endpoint Protection Manager" by interacting with the checkbox associated with it.

Figure 6:
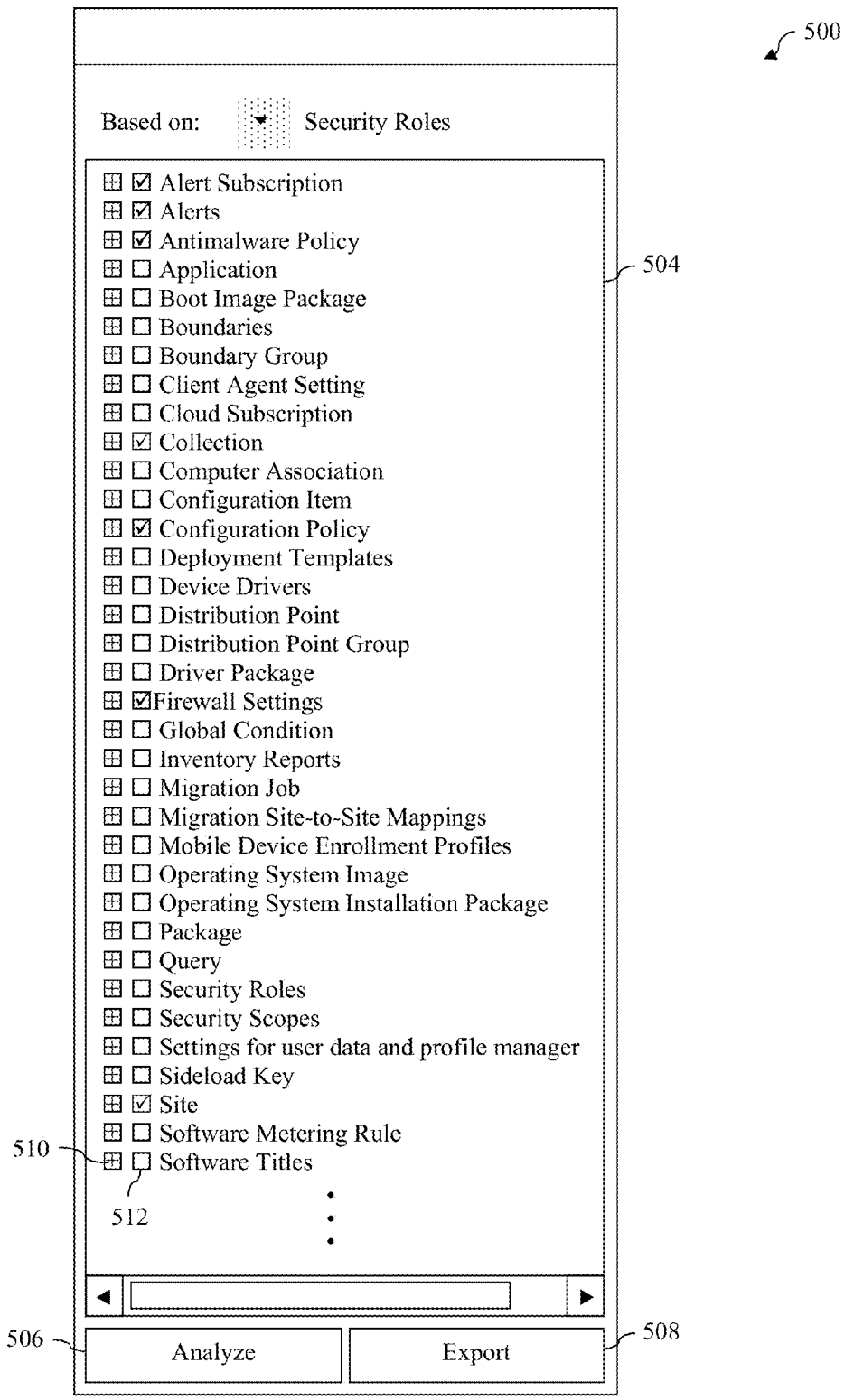
FIG. 6 depicts another view of the portion of the user interface shown in FIG. 5.

Once a user of RBAC modeling and auditing application 110 has selected a built-in security role, the security role is accessed and various permissions associated therewith are displayed in a permissions menu 504. FIG. 6 provides another view of user interface portion 500 in which permissions menu 504 is unobstructed by drop-down menu 502. As shown in FIGS. 5 and 6, permissions menu 504 includes a plurality of security objects and an expander and checkbox associated with each. For example, the security object "Software Titles" has an expander 510 and a checkbox 512 associated therewith.

Each security object shown in permissions menu 504 has one or more operations associated therewith (e.g., read, modify, delete, or the like). The operations associated with a security object may vary from security object to security object. In permissions menu 504, the state of the checkbox associated with a security object indicates what permissions the current security role has with respect to the security object. For example, if the checkbox is unchecked, the current security role has no permissions with respect to the corresponding security object. If the checkbox is checked, the current security role can perform all the operations that are associated with the corresponding secured object. If the checkbox is checked with a lightly-shaded or "grayed out" check, the current security role can only perform some of the operations that are associated with the corresponding security object.

As shown in FIGS. 5 and 6, the permissions associated with the security role "Endpoint Protection Manager" enable all operations to be performed with respect to the security objects "Alert Subscription," "Alerts," "Antimalware Policy," "Configuration Policy," and "Firewall Settings." Such permissions also enable some operations (but not all operations) to be performed with respect to the security objects "Collection" and "Site." Such permissions do not enable any operations to be performed with respect to any of the other security objects shown in permissions menu 504.

To access the operations associated with a particular security object, a user of RBAC modeling and auditing application 110 can interact with the expander associated with the particular security object in permissions menu 504 (e.g., by clicking on the expander using a pointing device such as a mouse or in some other manner). In response to such interaction, the operations associated with the particular security object will be displayed in permissions menu 504 along with a checkbox for each. Such checkboxes can be interacted with to assign or remove permissions at an operation level rather than at a security object level.

A user of RBAC modeling and auditing application 110 can thus interact with the user interface elements of user interface portion 500 to access a predefined or built-in security role and view the permissions associated with that security role. By varying the permissions through interaction with permissions menu 504, such user can also create entirely new security roles. An "export" button 508 may be interacted with to export digital representations of new security roles for subsequent importing into software application 150.

As further shown in FIG. 5, user interface portion 500 also includes an "analyze" button 506. By interacting with "analyze" button 506 (e.g., by clicking on "analyze" button 506 using a pointing device such as a mouse or in some other manner), a user of RBAC modeling and auditing application 110 can cause a simulated UI associated with the current security role to be presented. As previously discussed, such simulated UI may comprise one or more second user interface elements that indicate information that can be viewed by a user to whom the first security role has been assigned when interacting with software application 150 and/or one or more actions that can be performed by the user to whom the first security role has been assigned when interacting with software application 150.

Figure 7:
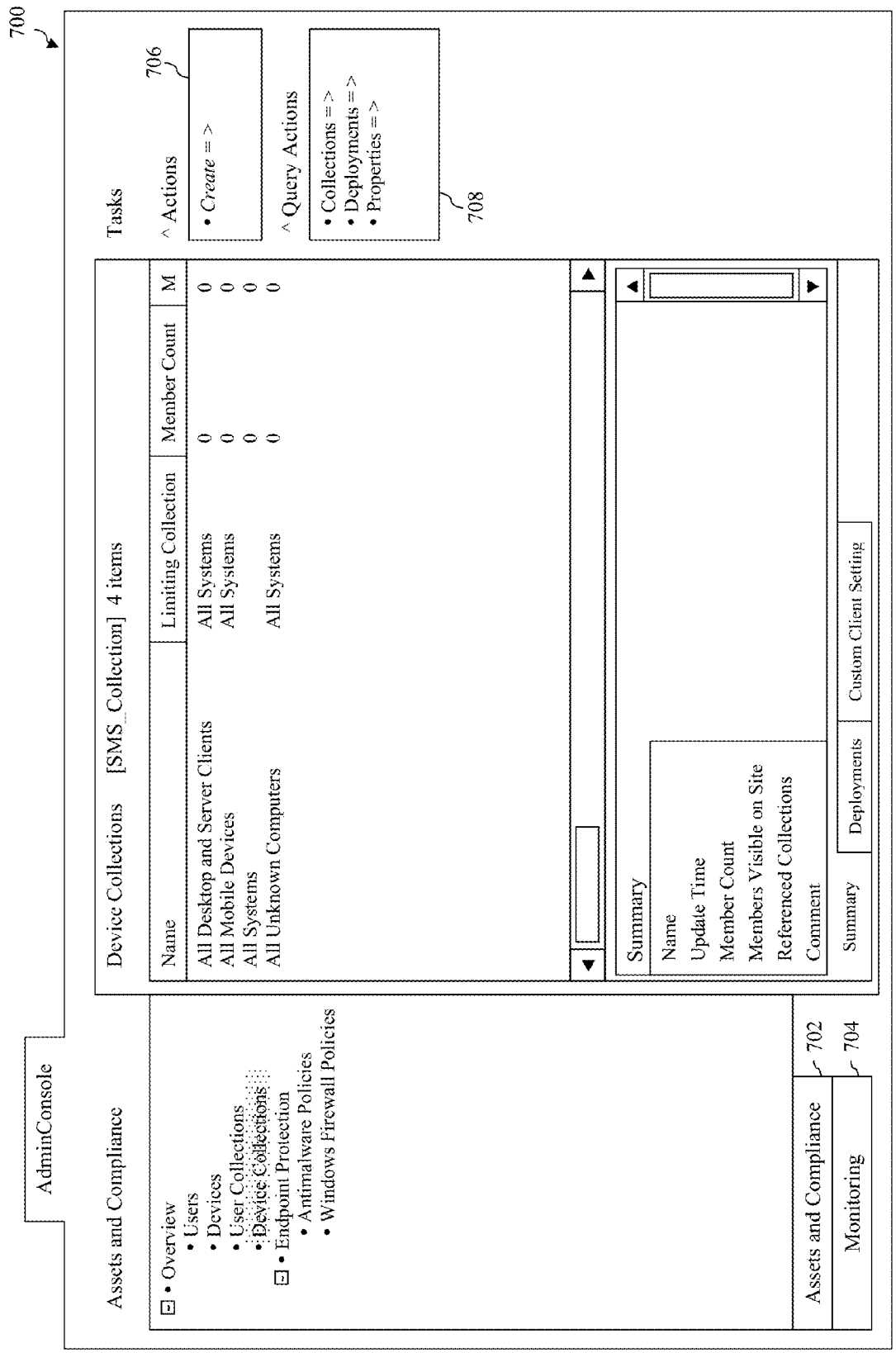
FIG. 7 depicts a portion of a user interface of an RBAC modeling and auditing application in accordance with an embodiment that includes a plurality of second user interface elements that together comprise a simulated UI of a software application for a first security role.

By way of example, FIG. 7 shows a portion 700 of a user interface of RBAC modeling and auditing application 110 that includes a plurality of second user interface elements that together comprise a simulated UI of a software application, such as software application 150, for a particular security role. In particular, user interface portion 700 represents the simulated UI for the "Endpoint Protection Manager" security role that was accessed using user interface portion 500 as previously described.

As shown in FIG. 7, user interface portion 700 includes elements that indicate various types of information that can be viewed by a user to whom the "Endpoint Protection Manager" security role has been assigned when such user interacts with software application 150. For example, the presence of an "assets and compliance" button 702 indicates that a user to whom the "Endpoint Protection Manager" security role has been assigned can obtain information about information technology (IT) assets that can be managed within an enterprise and information concerning compliance rules that may be enforced with respect to such assets. As another example, the presence of a "monitoring" button 704 indicates that a user to whom the "Endpoint Protection Manager" security role has been assigned can obtain information about monitoring functionality associated with such assets, including alerts, reporting, and the like.

As also shown in FIG. 7, user interface portion 700 also includes elements that indicate actions that may be performed by a user to whom the "Endpoint Protection Manager" security role has been assigned when such user interacts with software application 150. For example, an actions menu 706 and a query actions menu 708 indicate actions that may be performed with respect to certain device collections identified in user interface portion 700.

Figure 8:
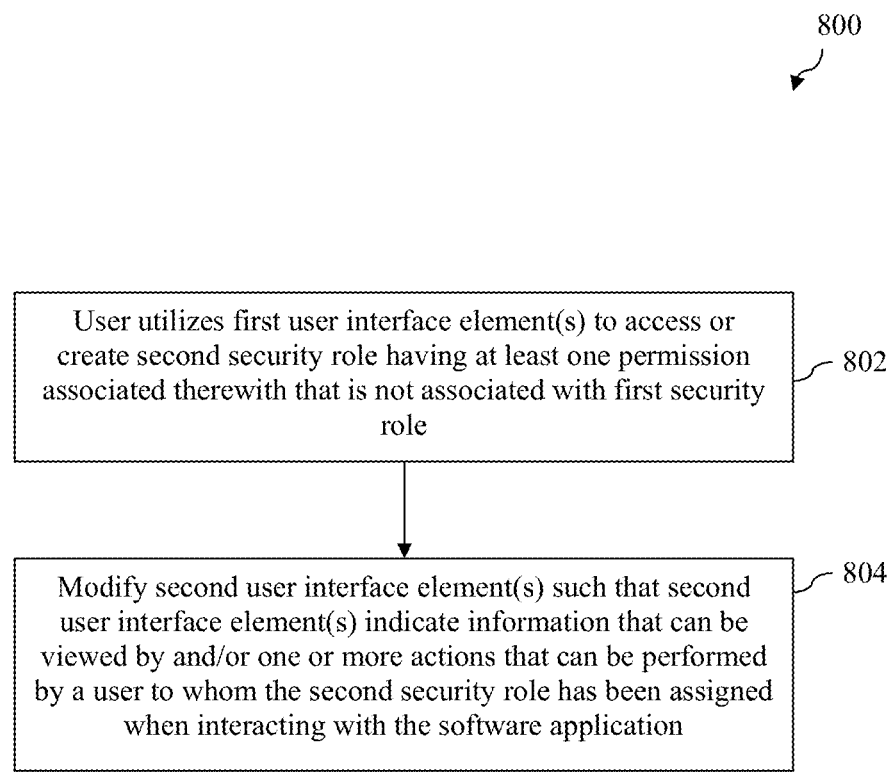
FIG. 8 depicts a flowchart of an additional method of presenting a simulated UI for a software application in accordance with an embodiment, wherein the simulated UI indicates information viewable and/or actions performable by a particular security role.

The manner of operation of security role modeling and auditing logic 112 will now be further illustrated with respect to FIG. 8. In particular, FIG. 8 depicts a flowchart 800 of an additional method of presenting a simulated UI for a software application, wherein the simulated UI indicates information viewable and/or actions performable by a particular security role. The steps of flowchart 800 may comprise operations performed by security role modeling and auditing logic 112 when such logic is executed by one or more processors. Although the method of flowchart 800 is described herein in reference to certain components of RBAC modeling and auditing system 100, it is noted that the method is not so limited, and the method may be performed by other components or systems.

As shown in FIG. 8, the method of flowchart 800 begins at step 802, in which a user of RBAC modeling and auditing application 110 utilizes the first user interface element(s) described above in reference to flowchart 300 of FIG. 3 to access or create a second security role. The second security role has at least one permission associated therewith that is not associated with the first security role discussed above in reference to flowchart 300 of FIG. 3. As discussed above in reference to step 302 of flowchart 300, the presentation of the first user interface element(s) may be performed by first computer program logic within security role modeling and auditing logic 112.

At step 804, security role modeling and auditing logic 112 modifies the one or more second user interface element(s) described above in reference to flowchart 300 of FIG. 3 such that the second user interface element(s) indicate information that can be viewed by a user to whom the second security role has been assigned when interacting with software application 150 and/or one or more actions that can be performed by the user to whom the second security role has been assigned when interacting with software application 150. The functions of step 804 may be performed, for example, by the second computer program logic within security role modeling and auditing logic 112 discussed above in reference to step 306 of flowchart 300.

Figure 9:
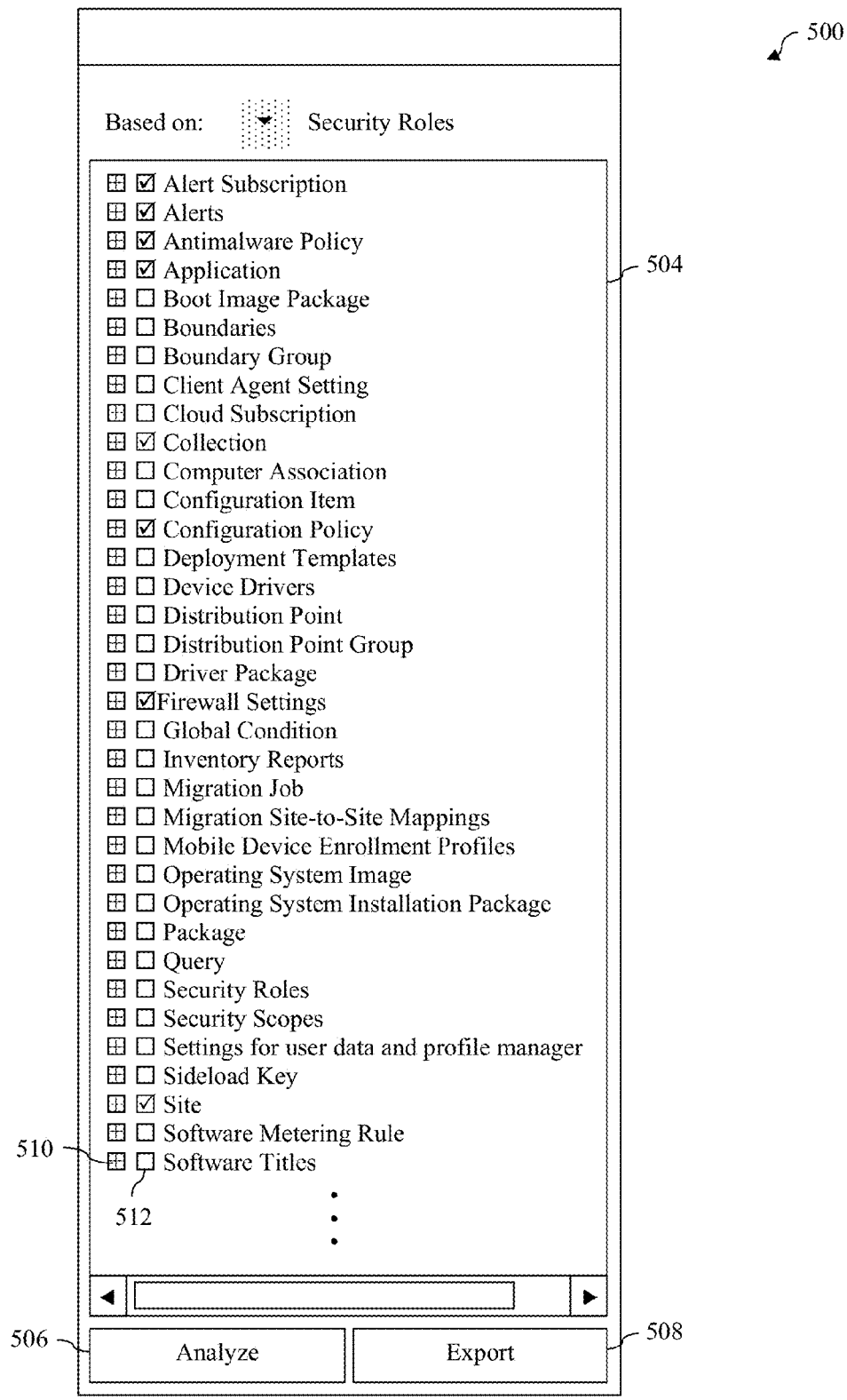
FIG. 9 depicts another view of the portion of the user interface shown in FIG. 5 after a user has interacted therewith to create a second security role.

One example of the manner in which step 802 may be performed will now be described in reference to FIG. 9. FIG. 9 depicts another view of user interface portion 500 after a user of RBAC modeling and auditing application 110 has interacted therewith to create a second security role. In particular, as shown in FIG. 9, the user has modified the permissions associated with the security role "Endpoint Protection Manager" by checking the checkbox associated with the security object "Applications," thereby granting the security role permission to perform all the operations associated with security object "Applications." This has the effect of creating a new, custom security role that can then be analyzed and exported.

Figure 10:
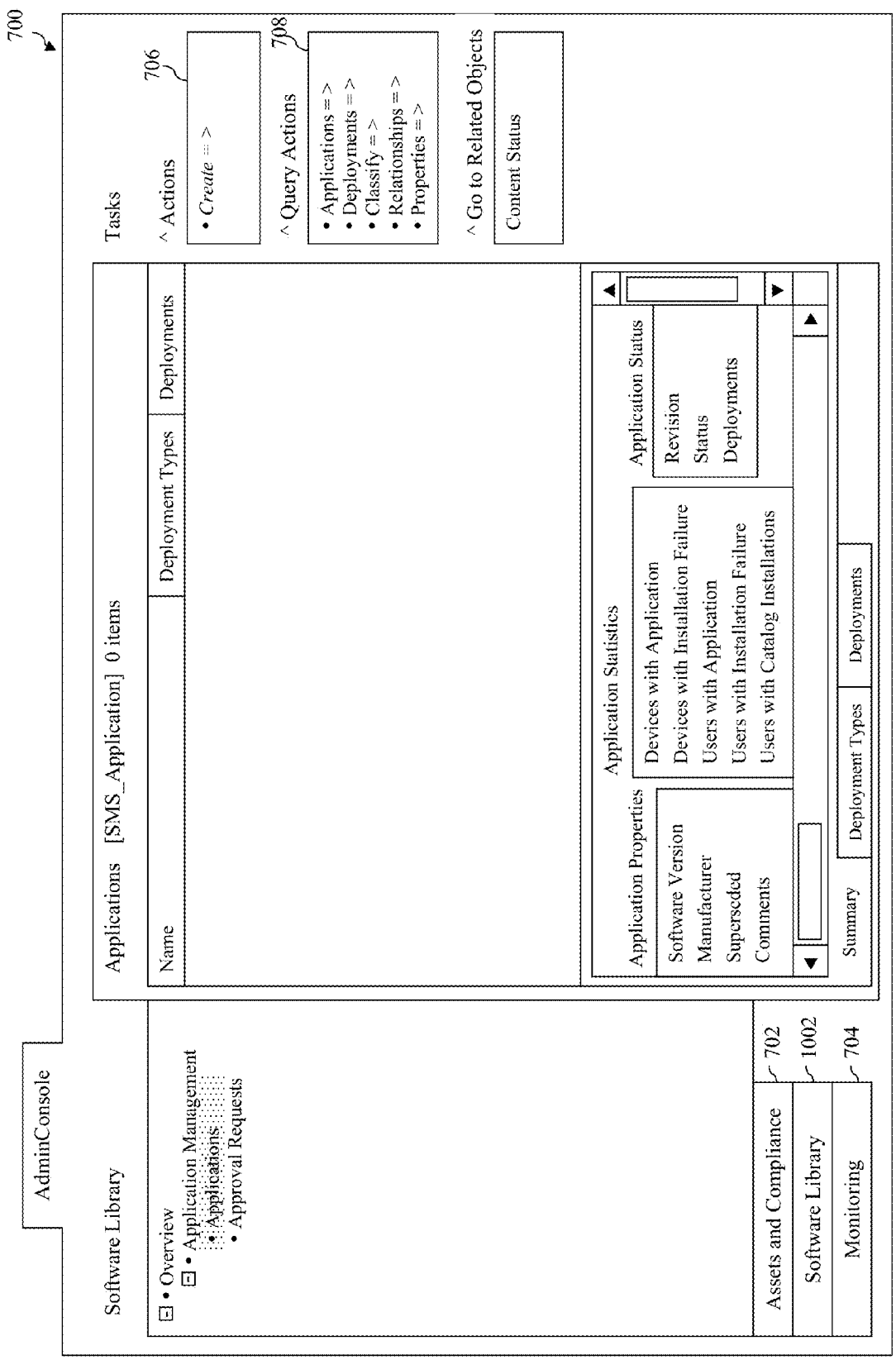
FIG. 10 depicts another view of the portion of the user interface shown in FIG. 7 after the second user interface elements thereof have been modified to comprise a simulated UI of a software application for a second security role.

One example of the manner in which step 804 may be performed will now be described in reference to FIG. 10. FIG. 10 depicts another view of user interface portion 700 after the user of RBAC modeling and auditing application 110 has created the new, custom security role in the manner discussed above in reference to FIG. 9 and has activated "analyze" button 506. In response to the activation of "analyze" button 506, the second user interface element(s) that together comprise the simulated UI are modified as shown in FIG. 10 to indicate the information viewable and actions performable by a user to whom the new, custom security role has been assigned.

Thus, as shown in FIG. 10, user interface portion 700 has been modified to include new elements that indicate new types of information that can be viewed by a user to whom the custom security role has been assigned when such user interacts with software application 150. For example, the presence of a new "software library" button 1002 indicates that a user to whom the custom security role has been assigned can obtain information about software assets that can be managed within an enterprise, such as applications that can be installed on machines, software updates that can be performed, or the like. Such information would not be available to a user to whom the "Endpoint Protection Manager" role has been assigned, and thus the simulated UI has been automatically changed to reflect that.

As also shown in FIG. 10, user interface portion 700 also includes new elements that indicate new actions that may be performed by a user to whom the custom security role has been assigned when such user interacts with software application 150. Such new actions are identified, for example, in actions menu 706 and query actions menu 708.

Thus, by automatically generating and presenting a simulated UI in the manner described above, security role modeling and auditing logic 112 makes it easy for a user of RBAC modeling and auditing application 110 to determine what information and actions will be made accessible via the UI of software application 150 for a security role accessed or created using RBAC modeling and auditing application 110.

III. "Run As" Functionality

Referring again to FIG. 1, it can be seen that RBAC modeling and auditing application 110 includes "run as" logic 114. Generally speaking, "run as" logic 114 enables a user of RBAC modeling and auditing application 110 to identify a user of software application 150. Then, based on one or more security roles that have been associated with the user of software application 150, "run as" logic 114 presents a simulated UI that indicates one or more of information that can be viewed by the user of software application 150 when interacting with software application 150 and one or more actions that can be performed by the user of software application 150 when interacting with software application 150. "Run as" logic 114 may also be used to present the security role(s) associated with the user of software application 150.

The manner of operation of "run as" logic 114 will now be described with further reference to flowchart 1100 of FIG. 11. The steps of flowchart 1100 may comprise operations performed by "run as" logic 114 when such logic executed by one or more processors. Although the method of flowchart 1100 is described herein in reference to certain components of RBAC modeling and auditing system 100, it is noted that the method is not so limited, and the method may be performed by other components or systems.

Figure 11:
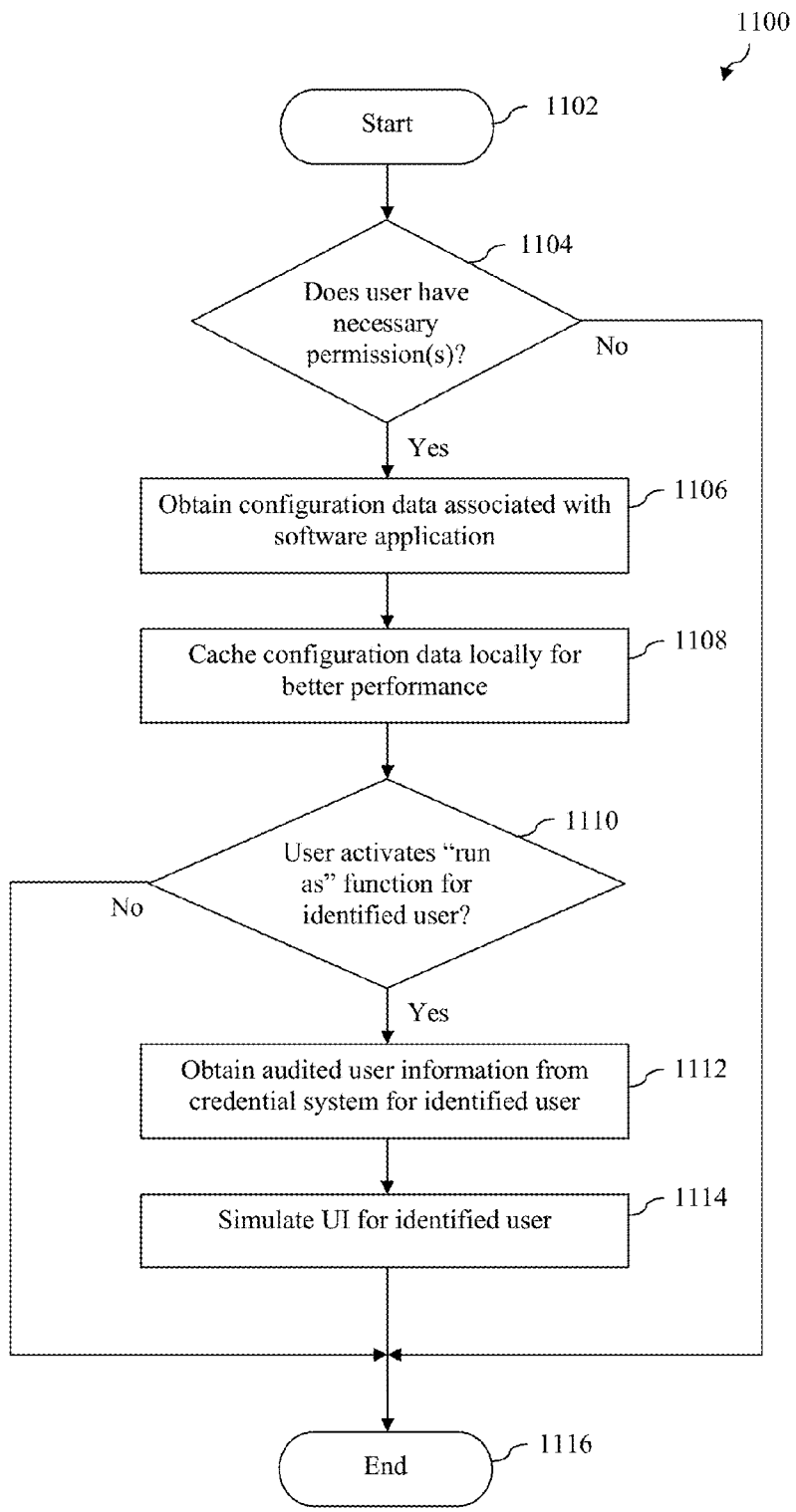
FIG. 11 depicts a flowchart of a method for generating a simulated UI for an identified user of a software application in accordance with an embodiment.

As shown in FIG. 11, the method of flowchart 1100 begins at step 1102. After step 1102, control passes to decision step 1104. During decision step 1104, "run as" logic 114 determines whether or not a user of RBAC modeling and auditing application 110 has one or more permissions necessary to utilize the functions thereof. This step may include, for example, determining whether the user of RBAC modeling and auditing application 110 has been assigned one or more security roles (e.g., full administrator, read-only analyst, or security administrator), has been assigned one or more security scopes (wherein a security scope indicates access to specific secured objects), and/or has been assigned one or more collections (wherein a collection is a group of devices or users the user can manage). However, these are only examples, and a variety of methods may be used to determine if the user of RBAC modeling and auditing application 110 has the necessary permission(s).

If "run as" logic 114 determines during decision step 1104 that the user of RBAC modeling and auditing application 110 does not have the permission(s) necessary to utilize the functions thereof, then the method ends at step 1116.

However, if "run as" logic 114 determines during decision step 1104 that the user of RBAC modeling and auditing application 110 does have the permission(s) necessary to utilize the functions thereof, then control passes to step 1106.

During step 1106, "run as" logic 114 obtains configuration data 170 associated with software application 150. In this particular embodiment, configuration data 170 is stored in a storage system that is remote with respect to the machine upon which RBAC modeling and auditing application 110 is running and is accessible thereto via one or more networks. Thus, step 1106 comprises obtaining configuration data 170 via the one or more networks. After step 1106, control passes to step 1108.

During step 1108, "run as" logic caches the configuration data 170 obtained during step 1106 in local storage 120, where it is represented as cached configuration data 122. By caching such configuration data locally, performance of certain features of RBAC modeling and auditing application 110 may be improved. After step 1108, control passes to decision step 1110.

During decision step 1110, "run as" logic 114 determines whether the user of RBAC modeling and auditing application 110 has activated a "run as" function for an identified user of software application 150. Various exemplary methods for activating a "run as" function for an identified user of software application 150 will be described herein.

If "run as" logic 114 determines during decision step 1110 that the user of RBAC modeling and auditing application 110 has not activated a "run as" function for an identified user of software application 150, then the method ends at step 1116.

However, if "run as" logic 114 determines during decision step 1110 that the user of RBAC modeling and auditing application 110 has activated a "run as" function for an identified user of software application 150, then control passes to step 1112.

During step 1112, "run as" logic 114 obtains audited user information from credential system 160 for the identified user of software application 150. This step may be performed, for example, to ensure that the identified user of software application 150 is a valid user. After step 1112, control passes to step 1114.

During step 1114, "run as" logic 114 generates and presents a simulated UI of software application 150 to the user of RBAC modeling and auditing application 110. "Run as" logic 112 generates the simulated UI by analyzing the credentials of the identified user and cached configuration data 122. The simulated UI may represent the UI that would be presented to the identified user of software application 150 when such identified user interacts with (e.g., logs into) software application 150. In particular, the simulated UI may indicate one or more of information that could be viewed by the identified user when interacting with software application 150 and one or more actions that can be performed by the identified user when interacting with software application 150. After step 1114, the method ends at step 1116.

Figure 12:
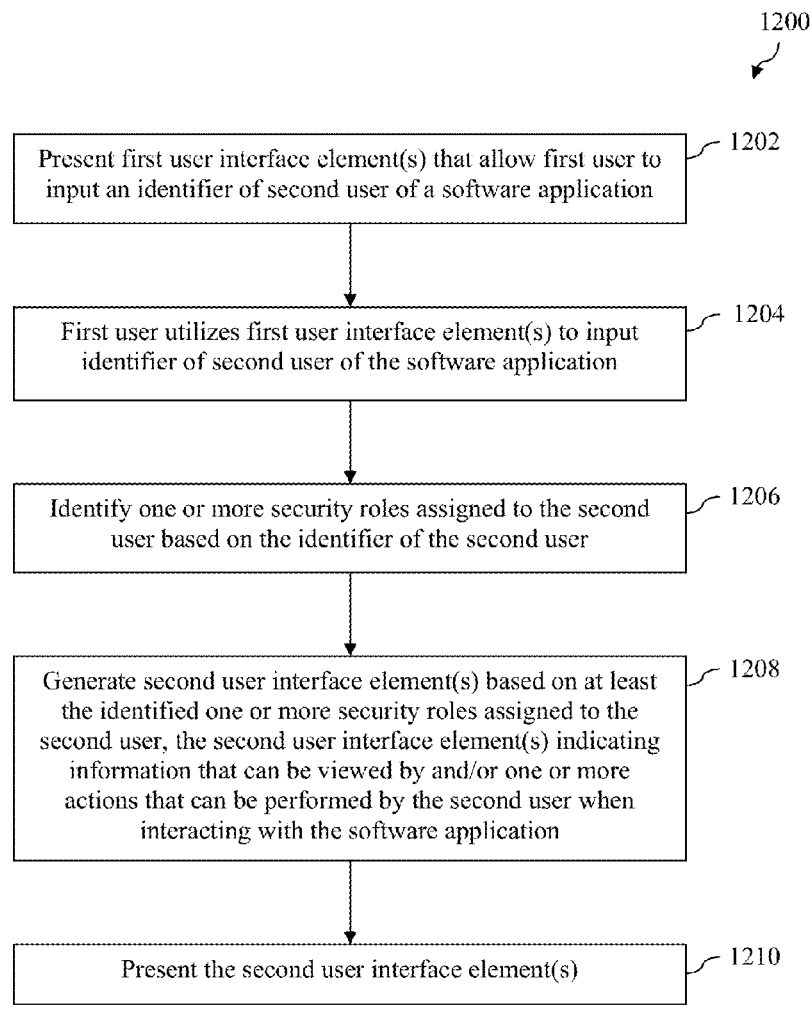
FIG. 12 depicts a flowchart of a method of presenting a simulated UI for a software application in accordance with an embodiment, wherein the simulated UI indicates information viewable and/or actions performable by a particular user of the software application.

The manner of operation of "run as" logic 114 will now be further illustrated with respect to FIG. 12. In particular, FIG. 12 depicts a flowchart 1200 of a method of presenting a simulated UI for a software application, wherein the simulated UI indicates information viewable and/or actions performable by a particular user of the software application. The steps of flowchart 1200 may comprise operations performed by "run as" logic 114 when such logic is executed by one or more processors. Although the method of flowchart 1200 is described herein in reference to certain components of RBAC modeling and auditing system 100, it is noted that the method is not so limited, and the method may be performed by other components or systems.

As shown in FIG. 12, the method of flowchart 1200 begins at step 1202, in which "run as" logic 114 presents one or more first user interface elements that allow a user of RBAC modeling and auditing application 110 (a "first user") to input an identifier of a user of a software application, such as software application 150 (a "second user"). The identifier may comprise, for example, a domain and username combination. However, this example is not intended to be limiting and a wide variety of other user identifiers may be used, including but not limited to an e-mail address or the like.

At step 1204, the first user utilizes the first user interface component(s) to input the identifier of the second user of software application 150.

At step 1206, "run as" logic 114 identifies one or more security roles assigned to the second user based on the identifier of the second user.

At step 1208, "run as" logic 114 generates one or more second user interface elements based on at least the identified one or more security roles assigned to the second user. The second user interface element(s) indicate information that can be viewed by the second user when interacting with software application 150 and/or one or more actions that can be performed by the second user when interacting with software application 150. These second user interface element(s) comprise a simulated UI of software application 150.

At step 1210, "run as" logic 114 presents the second user interface element(s) to the first user.

In an embodiment, the method of flowchart 1200 further includes obtaining configuration data 170 stored in a database associated with software application 150. In certain implementations, the configuration data 170 is cached in local storage 120, where it is represented as cached configuration data 122. Such configuration data may be used to generate at least one of the one or more second user interface elements discussed above.

Certain examples of the first user interface element(s) that a user can interact with to input an identifier of a second user of software application 150 as referred to in steps 1202 and 1204 of flowchart 1200 will now be provided. By way of example, FIG. 13 shows a portion 1300 of a user interface of RBAC modeling and auditing application 110 that includes a plurality of first user interface elements that a user can interact with to input an identifier of a second user of software application 150.

Figure 13:
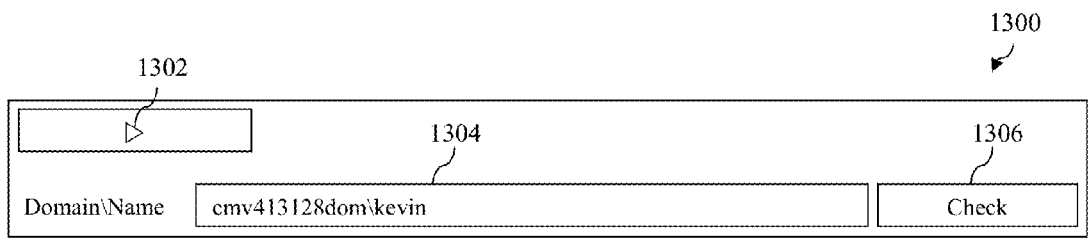
FIG. 13 shows a portion of a user interface of an RBAC modeling and auditing application in accordance with an embodiment that includes a plurality of first user interface elements that a user can interact with to input an identifier of a second user of a software application.

In particular, as shown in FIG. 13, user interface portion 1300 includes a "run as" button 1302, a text entry box 1304 and a "check" button 1306. A user of RBAC modeling and auditing application 110 may access the various "run as" features described herein by first interacting with "run as" button 1302. For example, in one embodiment, when a user activates "run as" button 1302, text entry box 1304 and "check" button 1306 appear. A user of RBAC modeling and auditing application 110 may then enter an identifier of the second user of software application 150 in text entry box 1304. In the example shown in FIG. 13, a user of RBAC modeling and auditing application 110 has input an identifier of the second user in the form of the domain\name combination "cmv413128dom\kevin". After typing in the identifier, the user of RBAC modeling and auditing application 110 may then interact with "check" button 1306 to cause a simulated UI for the second user to appear.

Figure 14:
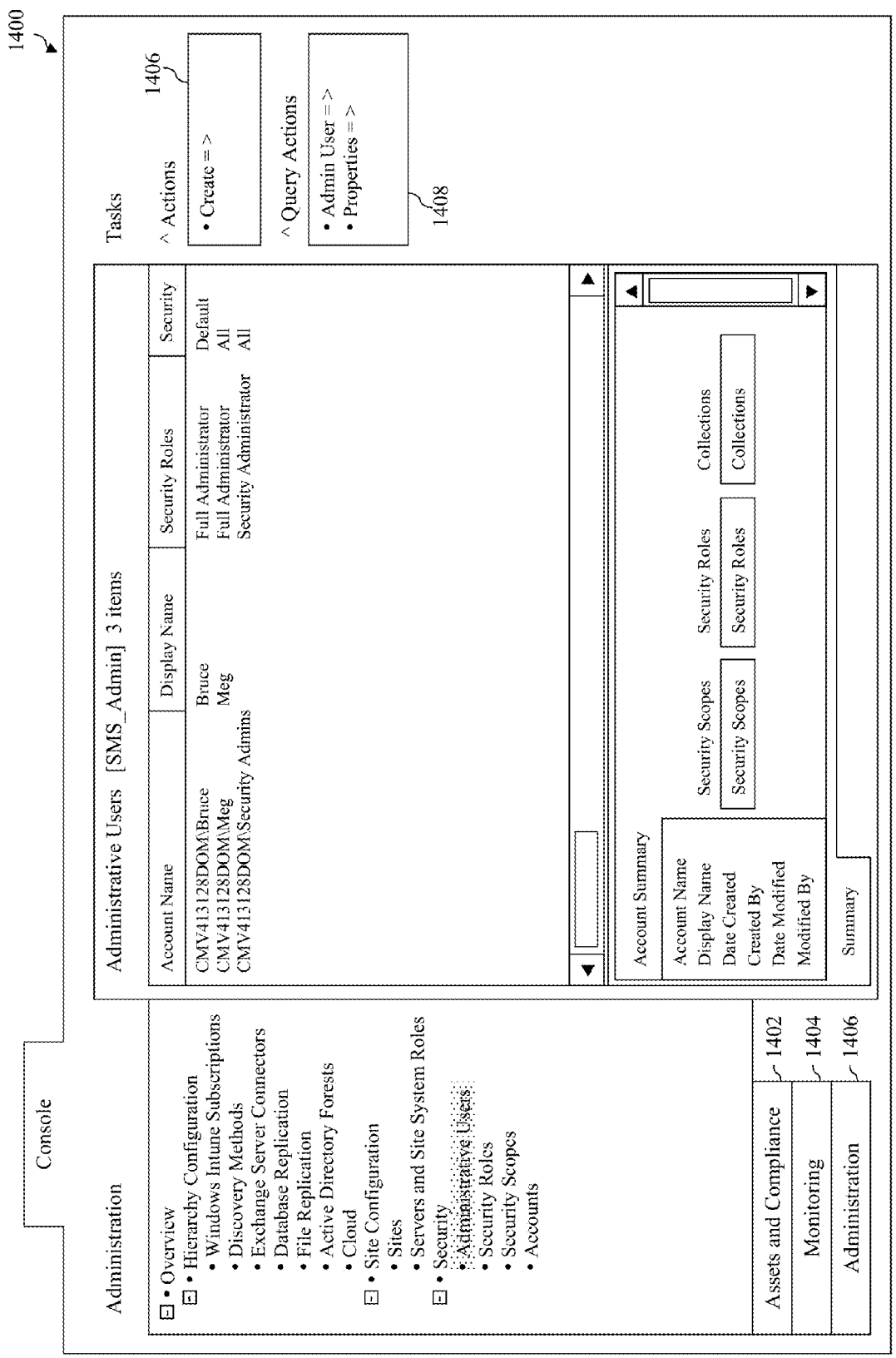
FIG. 14 depicts a portion of a user interface of an RBAC modeling and auditing application in accordance with an embodiment that includes a plurality of second user interface elements that together comprise a simulated UI of a software application for a particular user.

FIG. 14 shows the simulated UI for the second user. In particular, FIG. 14 shows a portion 1400 of a user interface of RBAC modeling and auditing application 110 that includes a plurality of second user interface elements that together comprise a simulated UI of software application 150 for the second user (i.e., the user identified by the domain/name "cmv413128dom\kevin").

As shown in FIG. 14, user interface portion 1400 includes elements that indicate various types of information that can be viewed by the second user when the second user interacts with software application 150. For example, the presence of an "assets and compliance" button 1402 indicates that the second user can obtain information about IT assets that can be managed within an enterprise and information concerning compliance rules that may be enforced with respect to such assets. As another example, the presence of a "monitoring" button 1404 indicates that the second user can obtain information about monitoring functionality associated with such assets, including alerts, reporting, and the like. As a still further example, the presence of an "administration" button 1406 indicates that the second user can obtain information relating to administration of the IT assets and various users thereof.

As also shown in FIG. 14, user interface portion 1400 also includes elements that indicate actions that may be performed by the second user when such user interacts with software application 150. For example, an actions menu 1406 and a query actions menu 1408 indicate actions that may be performed with respect to certain administrative users identified in user interface portion 1400.

Figure 15:
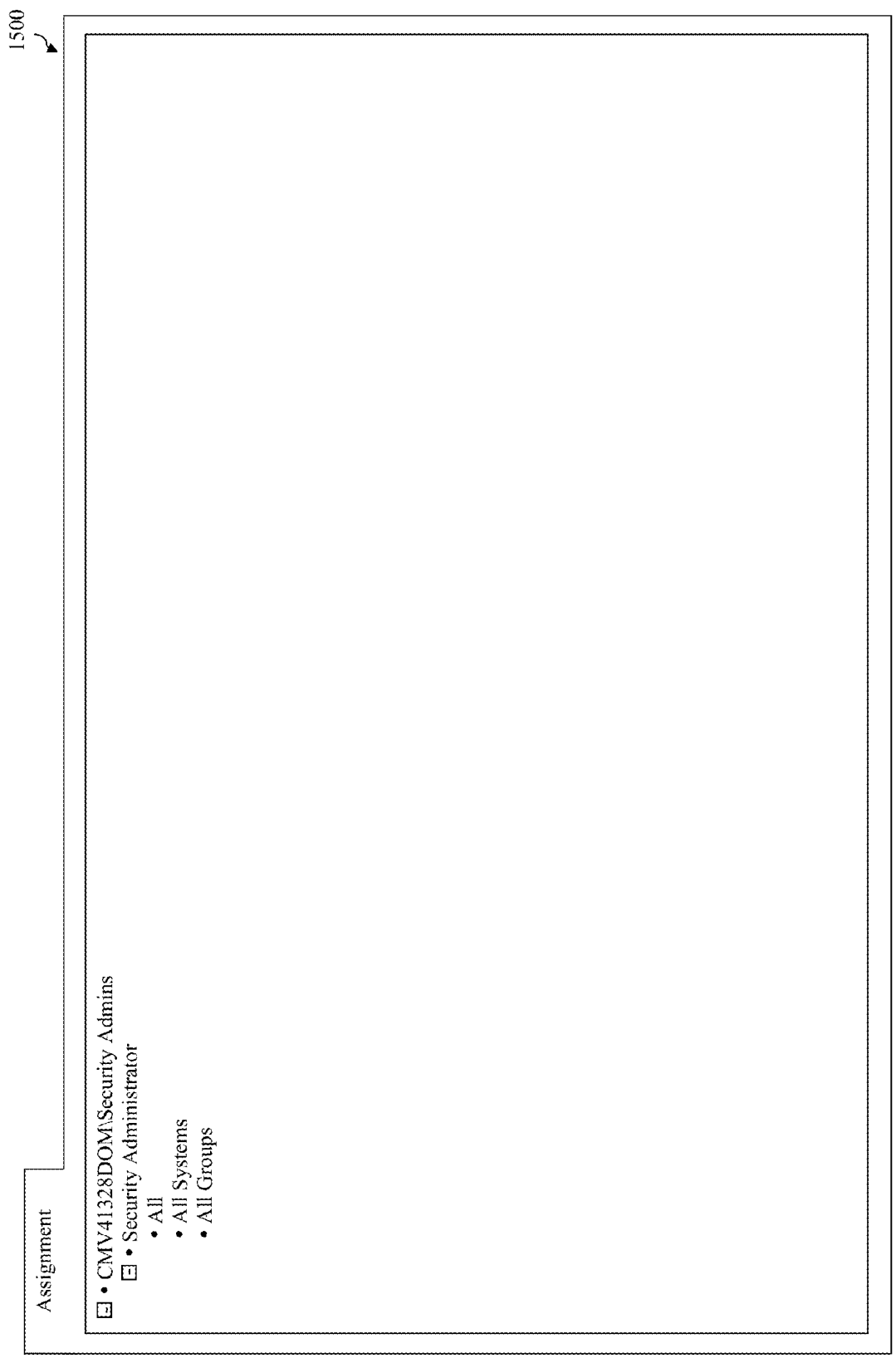
FIG. 15 depicts a portion of a user interface of an RBAC modeling and auditing application that displays the security roles associated with a particular user of a software application.

In accordance with further embodiment, "run as" logic 114 may also be configured to present one or more third user interface elements that show the security roles associated with the second user. An example of this is shown in FIG. 15. In particular, FIG. 15 shows a portion 1500 of a user interface of RBAC modeling and auditing application 110 that shows the security roles associated with the second user. In particular, portion 15 shows that the user identified by the domain/name "cmv413128dom\kevin" belongs to the security group "Security Admins" and has been assigned the security role "Security Administrator."

IV. Example Processor-Based System Implementation

Figure 16:
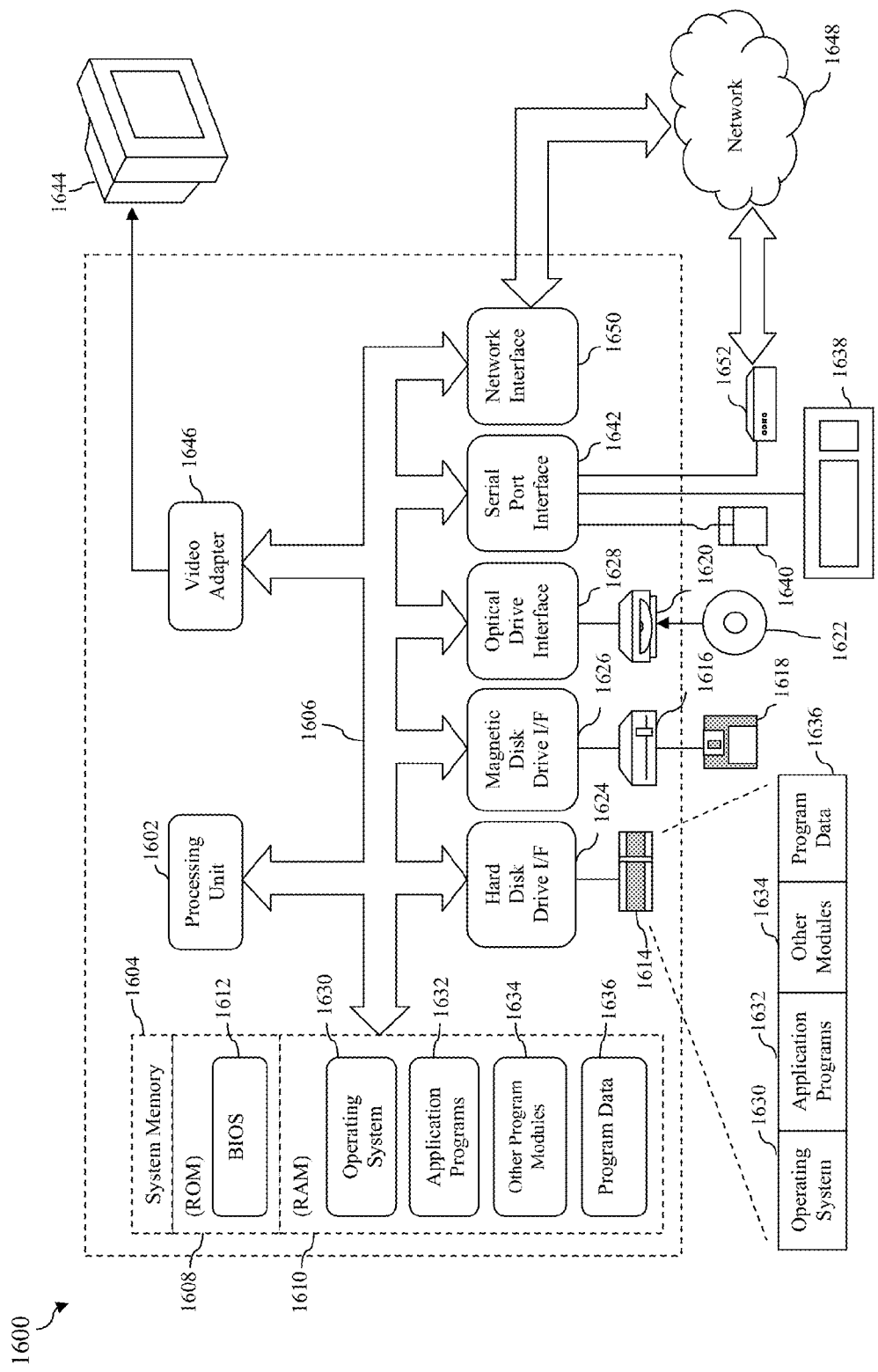
FIG. 16 is a block diagram of an example processor-based computer system that may be used to implement various embodiments.

FIG. 16 depicts an example processor-based computer system 1600 that may be used to implement various embodiments described herein. For example, system 1600 may be used to execute RBAC modeling and auditing application 110, software application 150, and/or credential system 160 as described above in reference to FIG. 1 as well as any components included therein. The description of system 1600 provided herein is provided for purposes of illustration, and is not intended to be limiting. Embodiments may be implemented in further types of computer systems, as would be known to persons skilled in the relevant art(s).

As shown in FIG. 16, system 1600 includes a processing unit 1602, a system memory 1604, and a bus 1606 that couples various system components including system memory 1604 to processing unit 1602. Processing unit 1602 may comprise one or more processors or processing cores. Bus 1606 represents one or more of any of several types of bus structures, including a memory bus or memory controller, a peripheral bus, an accelerated graphics port, and a processor or local bus using any of a variety of bus architectures. System memory 1604 includes read only memory (ROM) 1608 and random access memory (RAM) 1610. A basic input/output system 1612 (BIOS) is stored in ROM 1608.

System 1600 also has one or more of the following drives: a hard disk drive 1614 for reading from and writing to a hard disk, a magnetic disk drive 1616 for reading from or writing to a removable magnetic disk 1618, and an optical disk drive 1620 for reading from or writing to a removable optical disk 1622 such as a CD ROM, DVD ROM, BLU-RAY™ disk or other optical media. Hard disk drive 1614, magnetic disk drive 1616, and optical disk drive 1620 are connected to bus 1606 by a hard disk drive interface 1624, a magnetic disk drive interface 1626, and an optical drive interface 1628, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1630, one or more application programs 1632, other program modules 1634, and program data 1636. In accordance with various embodiments, the program modules may include computer program logic that is executable by processing unit 1602 to perform any or all of the functions and features of any of RBAC modeling and auditing application 110, software application 150, and/or credential system 160 as described above in reference to FIG. 1 as well as any components included therein. The program modules may also include computer program logic that, when executed by processing unit 1602, performs any of the steps or operations shown or described in reference to the flowcharts of FIGS. 2, 3, 8, 11 and 12.

A user may enter commands and information into system 1600 through input devices such as a keyboard 1638 and a pointing device 1640. Other input devices (not shown) may include a microphone, joystick, game controller, scanner, or the like. In one embodiment, a touch screen is provided in conjunction with a display 1644 to allow a user to provide user input via the application of a touch (as by a finger or stylus for example) to one or more points on the touch screen. These and other input devices are often connected to processing unit 1602 through a serial port interface 1642 that is coupled to bus 1606, but may be connected by other interfaces, such as a parallel port, game port, or a universal serial bus (USB).

A display 1644 is also connected to bus 1606 via an interface, such as a video adapter 1646. In addition to display 1644, system 1600 may include other peripheral output devices (not shown) such as speakers and printers.

System 1600 is connected to a network 1648 (e.g., a local area network or wide area network such as the Internet) through a network interface or adapter 1650, a modem 1652, or other suitable means for establishing communications over the network. Modem 1652, which may be internal or external, is connected to bus 1606 via serial port interface 1642.

As used herein, the terms "computer program medium," "computer-readable medium," and "computer-readable storage medium" are used to generally refer to media such as the hard disk associated with hard disk drive 1614, removable magnetic disk 1618, removable optical disk 1622, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1632 and other program modules 1634) may be stored on the hard disk, magnetic disk, optical disk, ROM, or RAM. Such computer programs may also be received via network interface 1650, serial port interface 1642, or any other interface type. Such computer programs, when executed or loaded by an application, enable computer 1600 to implement features of embodiments of the present invention discussed herein. Accordingly, such computer programs represent controllers of the computer 1600.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

In alternative implementations, any of RBAC modeling and auditing application 110, software application 150, and/or credential system 160 as described above in reference to FIG. 1 as well as any components included therein may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A computer-implemented method, comprising:
presenting to a first user one or more first user interface elements that allow the first user to access or create a first security role, the first security role having one or more permissions associated therewith that specify whether a second user is permitted to perform at least one of the following actions: read a security object, modify a security object, and delete a security object; and
presenting to the first user one or more second user interface elements that, based at least on an interaction with the one or more second user interface elements by the first user, cause a simulation of a graphical user interface of a first software application to be presented to the first user, the simulation of the graphical user interface indicating at least one of:
information that can be viewed by the second user to whom the first security role has been assigned when the second user interacts with the graphical user interface of the first software application, and
one or more actions that can be performed by the second user when the second user interacts with the graphical user interface of the first software application.

2. The method of claim 1, wherein presenting to the first user the one or more first user interface elements comprises presenting one or more user interface elements that allow the first user to select the first security role from among a plurality of predefined security roles.

3. The method of claim 1, wherein presenting to the first user the one or more first user interface elements comprises presenting one or more user interface elements that allow the first user to select the one or more permissions associated with the first security role.

4. The method of claim 1, wherein presenting to the first user the one or more first user interface elements comprises presenting one or more user interface elements that further allow the first user to access or create a second security role having at least one permission associated therewith that is not associated with the first security role, the method further comprising:
modifying the simulation of the graphical user interface such that the simulation of the graphical user interface indicates at least one of:
information that can be viewed by a user to whom the second security role has been assigned when the user to whom the second security role has been assigned interacts with the first software application, and
one or more actions that can be performed by the user to whom the second security role has been assigned when the user to whom the second security role has been assigned interacts with the first software application.

5. The method of claim 1, wherein presenting to the first user the simulation of the graphical user interface comprises presenting the simulation of the graphical user interface concurrently with the one or more first user interface elements.

6. The method of claim 1, further comprising:
determining that the first user has one or more required permissions; and
performing the presenting steps only if a determination is made that the first user has the one or more required permissions.

7. The method of claim 1, wherein the presenting steps are performed by a second software application.

8. The method of claim 7, wherein the second software application comprises a tool associated with the first software application.

9. The method of claim 7, further comprising:
obtaining configuration data stored in a database associated with the first software application by the second software application, the configuration data comprising at least one or more permissions that may be associated with a security role, and for each of the one or more permissions, one or more of information viewable by a user having the permission and one or more actions performable by a user having the permission; and
using the configuration data to generate at least one of the one or more first user interface elements and the simulation of the graphical user interface.

10. The method of claim 9, further comprising:
caching the obtained configuration data by the second software application.

11. A system, comprising:
one or more processors; and
a storage medium that stores computer program logic that is executable by the one or more processors, the computer program logic comprising:
first computer program logic that is programmed to cause the one or more processors to present to a first user one or more first user interface elements that allow the first user to access or create a first security role, the first security role having one or more permissions associated therewith that specify whether a second user is permitted to perform at least one of the following actions: read a security object, modify a security object, and delete a security object; and
second computer program logic that is programmed to cause the one or more processors to present to the first user a simulation of a graphical user interface of a first software application concurrently with the one or more first user interface elements, the simulation of the graphical user interface indicating:
information that can be viewed by the second user to whom the first security role has been assigned when the second user interacts with the graphical user interface of the first software application, and one or more actions that can be performed by the second user when the second user interacts with the graphical user interface of the first software application.

12. The system of claim 11, wherein the one or more first user interface elements allow the first user to select the first security role from among a plurality of predefined security roles.

13. The system of claim 11, wherein the one or more first user interface elements allow the first user to select the one or more permissions associated with the first security role.

14. The system of claim 11, wherein the one or more first user interface elements further allow the first user to access or create a second security role having at least one permission associated therewith that is not associated with the first security role; and wherein the second computer program logic is programmed to cause the one or more processors to modify the simulation of the graphical user interface such that the simulation of the graphical user interface indicates:

information that can be viewed by a user to whom the second security role has been assigned when the user to whom the second security role has been assigned interacts with the first software application, and one or more actions that can be performed by the user to whom the second security role has been assigned when the user to whom the second security role has been assigned interacts with the first software application.

15. The system of claim 11, wherein the first computer program logic and the second computer program logic comprise portions of a second software application.

16. The system of claim 15, wherein the computer program logic stored by the storage medium further comprises:

third computer program logic that is programmed to cause the one or more processors to obtain configuration data stored in a database associated with the first software application, the configuration data comprising at least one or more permissions that may be associated with a security role, and for each of the one or more permissions, one or more of information viewable by a user having the permission and one or more actions performable by a user having the permission;

wherein the first computer program logic is programmed to cause the one or more processors to generate the one or more first user interface elements using the configuration data and the second computer program logic is programmed to cause the one or more processors to generate the simulation of the graphical user interface using the configuration data.

17. A computer-implemented method, comprising:

presenting to a first user one or more first user interface elements that allow the first user to input an identifier of a second user of a first software application; and in response to the first user at least inputting the identifier of the second user via the first user interface:

identifying one or more security roles assigned to the second user based on the identifier of the second user, the one or more security roles specifying whether the second user is permitted to perform at least one of the following actions: read a security object, modify a security object, and delete a security object; and presenting to the first user a simulation of a graphical user interface of a first software application based at least on the identified one or more security roles, the simulation of the graphical user interface indicating of at least one of:

information that can be viewed by the second user when the second user interacts with the graphical user interface of the first software application, and one or more actions that can be performed by the second user when the second user interacts with the graphical user interface of the first software application.

18. The method of claim 17, further comprising:

presenting to the first user one or more second user interface elements that show the identified one or more security roles.

19. The method of claim 17, wherein the presenting to the first user the one or more first user interface elements, the identifying the one or more security roles assigned to the second user based on the identifier of the second user and the presenting to the first user the simulation of the graphical user interface of the first software application based at least on the identified one or more security roles are performed by a second software application.

20. The method of claim 17, wherein the second software application comprises a tool associated with the first software application.

* * * * *